US006934963B1

(12) United States Patent
Reynolds et al.

(10) Patent No.: US 6,934,963 B1
(45) Date of Patent: Aug. 23, 2005

(54) INTERACTIVE TELEVISION PROGRAM GUIDE WITH PASSIVE CONTENT

(75) Inventors: Steven J. Reynolds, Littleton, CO (US); David M. Berezowski, Tulsa, OK (US); Robert A. Knee, Lansdale, PA (US); Michael D. Ellis, Boulder, CO (US); Joshua A. Rosenthol, East Norriton, PA (US); William Hein, Glenmore, PA (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/400,391

(22) Filed: Sep. 21, 1999

Related U.S. Application Data
(60) Provisional application No. 60/101,355, filed on Sep. 22, 1998.

(51) Int. Cl.[7] .................................... H04N 5/445
(52) U.S. Cl. ........................ 725/39; 725/38; 725/40; 725/41; 725/60; 725/61; 725/42; 725/43
(58) Field of Search ..................... 725/60, 61, 37–59

(56) References Cited

U.S. PATENT DOCUMENTS

| | | | |
|---|---|---|---|
| 4,203,130 A | 5/1980 | Doumit et al. ............... 358/1 |
| 4,488,179 A | 12/1984 | Krüger et al. .............. 358/181 |
| 4,691,351 A | 9/1987 | Hayashi et al. .............. 380/10 |
| 4,706,121 A | 11/1987 | Young ........................ 358/142 |
| 4,714,919 A | 12/1987 | Foster ........................ 340/726 |
| 4,751,578 A | 6/1988 | Reiter et al. ............... 358/183 |
| 4,787,063 A | 11/1988 | Muguet ...................... 364/900 |
| 4,899,139 A | 2/1990 | Ishimochi et al. ........... 340/721 |
| 4,942,391 A | 7/1990 | Kikuta ....................... 340/745 |
| 4,963,994 A | 10/1990 | Levine ....................... 358/335 |
| 4,977,455 A | 12/1990 | Young ........................ 358/142 |
| 5,038,211 A | 8/1991 | Hallenbeck ................. 358/142 |
| 5,093,718 A | 3/1992 | Hoarty et al. ................ 358/84 |
| 5,151,789 A | 9/1992 | Young ...................... 358/194.1 |
| 5,172,413 A | 12/1992 | Bradley et al. ............... 380/20 |

(Continued)

FOREIGN PATENT DOCUMENTS

| | | | | |
|---|---|---|---|---|
| GB | 2 232 031 | 11/1990 | .......... H04N/5/445 |
| GB | 2 264 409 | 8/1993 | .......... H04N/5/445 |
| WO | WO 86/01359 | 2/1986 | .......... H04N/5/445 |
| WO | WO 91/05436 | 4/1991 | ........... H04N/5/44 |
| WO | WO 97/19555 | 5/1997 | ........... H04N/7/16 |
| WO | WO 98/06219 | 2/1998 | ........... H04N/7/10 |
| WO | WO 98/41013 | 9/1998 | .......... H04N/5/445 |

OTHER PUBLICATIONS

Vito Brugliera, "Digital On–Screen Display–A New Technology for the Consumer Interface," Symposium Record Cable Sessions, 18th International Television Symposium and Technical Exhibition, Montreux, Switzerland Jun. 10–15, 1993, pp. 572–586 (Jun. 11, 1993).

*Primary Examiner*—John Miller
*Assistant Examiner*—Annan Q Shang
(74) *Attorney, Agent, or Firm*—Fish & Neave IP Group of Ropes & Gray LLP

(57) ABSTRACT

A hybrid passive-interactive program guide is generated by combining the features of an interactive program guide with the passive video portion of a passive program guide. The interactive guide may replace passive listings with interactive listings, replace passive features with interactive features, provide supplemental advertisements, or replace passive tagging information with interactive tagging information. Users may be provided with an opportunity to purchase a program or product being advertised, to view listings for segments aired in the video portion of the passive guide, to schedule reminders for listings or video segments that are displayed by the passive guide, or to schedule video segments and related information for recording.

47 Claims, 23 Drawing Sheets

U.S. PATENT DOCUMENTS

| | | | |
|---|---|---|---|
| 5,210,611 A | 5/1993 | Yee et al. | 358/191.1 |
| 5,253,066 A | 10/1993 | Vogel | 358/188 |
| 5,285,278 A | 2/1994 | Holman | 358/142 |
| 5,404,393 A | 4/1995 | Remillard | 379/96 |
| 5,412,720 A | 5/1995 | Hoarty | 380/15 |
| 5,465,385 A | 11/1995 | Ohga et al. | 455/6.1 |
| 5,479,268 A | 12/1995 | Young et al. | 358/335 |
| 5,548,338 A * | 8/1996 | Ellis et al. | 725/54 |
| 5,635,978 A * | 6/1997 | Alten et al. | 725/42 |
| 5,699,107 A | 12/1997 | Lawler et al. | 348/13 |
| 5,835,717 A * | 11/1998 | Karlton et al. | 725/46 |
| 5,892,498 A | 4/1999 | Marshall et al. | 345/123 |
| 6,014,184 A * | 1/2000 | Knee et al. | 725/45 |
| 6,064,376 A * | 5/2000 | Berezowski et al. | 725/42 |
| 6,172,677 B1 * | 1/2001 | Stautner et al. | 345/716 |
| 6,262,722 B1 * | 7/2001 | Allison et al. | 725/39 |
| 6,292,624 B1 * | 9/2001 | Saib et al. | 386/83 |
| 6,314,570 B1 * | 11/2001 | Tanigawa et al. | 725/40 |
| 6,388,714 B1 * | 5/2002 | Schein et al. | 348/563 |
| 6,415,437 B1 * | 7/2002 | Ludvig et al. | 725/41 |
| 6,460,179 B1 * | 10/2002 | Kretz et al. | 725/37 |
| 6,469,753 B1 * | 10/2002 | Klosterman et al. | 348/552 |
| 6,505,348 B1 * | 1/2003 | Knowles et al. | 725/49 |
| 6,515,680 B1 * | 2/2003 | Hendricks et al. | 715/716 |
| 6,526,576 B1 * | 2/2003 | Kwoh | 725/39 |
| 6,828,993 B1 * | 12/2004 | Hendricks et al. | 715/819 |

* cited by examiner

91

SPORTS TALK SHOW
(FOOTBALL)

WELCOME TO FOOTBALL.WEB

STANDINGS
STATISTICS
PLAYERS
WEEKLY LINEUP

INTERACTIVE TELEVISION PROGRAM GUIDE WITH PASSIVE CONTENT

This application claims the benefit of U.S. provisional application No. 60/101,355, filed Sep. 22, 1998.

BACKGROUND OF THE INVENTION

This invention relates to electronic television program guide systems, and more particularly, to interactive television program guide systems with passive content.

Cable, satellite, and broadcast television systems provide viewers with a large number of television channels. Users have traditionally consulted printed television program schedules to determine the programs being broadcast at a particular time. More recently, passive television program guides have been developed that allow users to tune to a television channel and view a list of program listings for upcoming programs. Passive guides have been developed that display video promotions in one portion of the screen, while displaying program listings in another.

Passive guides require users to wait until the list of program listings scrolls to display listings for the channel or time that the users are interested in. Users of passive guides have no way of controlling how quickly or how often listings appear, and have no way of immediately viewing listings for particular channels or time slots. In addition, passive guides do not provide users with the ability to schedule programs for recording, to view listings for favorite channels, to parentally control programs, or to perform other desirable functions that require user interaction.

Interactive television program guides have been developed that allow television program information to be displayed on a user's television. Interactive television program guides, which are typically implemented on set-top boxes, allow users to navigate through television program listings using a remote control. In a typical interactive program guide, various groups of television program listings are displayed in a grid or table according to predefined or user-selected categories. With interactive guides, however, there is generally no way to provide centrally-controlled promotional media such as promotional videos to users for display by the program guide while the users are viewing program listings.

Hybrid passive-interactive program guide systems have been proposed in which the video portion of a passive guide channel is combined with interactive listings. Such systems provide some of the benefits of interactive television program guides while maintaining the video capability of passive guides. It would be desirable if a hybrid program guide system could be provided in which the interactive program guide features of the system are coordinated with the passive components of the system in order to improve the display screens provided by the system, and to provide interactive program guide features related to passive guide content.

It is therefore an object of the present invention to provide a hybrid passive-interactive television program guide in which the interactive program guide features are coordinated with the passive program guide components of the system.

SUMMARY OF THE INVENTION

This and other objects of the present invention are accomplished in accordance with the principles of the present invention by providing a hybrid passive-interactive television program guide system in which passive electronic television program guide content is integrated with an interactive television program guide. Information on the content of the passive electronic television program guide is provided to the interactive television program guide, so that the features on the interactive television program guide may be coordinated with the passive guide content.

In the hybrid guide system of the present invention, a main facility (e.g., a satellite uplink facility) provides data from a data source to a number of distribution facilities (e.g., cable system headends, broadcast distribution facilities, a satellite distribution facilities, or any other suitable distribution facilities). There may be multiple data sources, some of which may be located at different facilities and which provide data to the main facility for localization and distribution. The data transmitted by the main facility to the distribution facilities includes television programming data (e.g., titles, channels, content information, rating information, advertising information or any other information associated with television programming), and may include other data for additional services other than television program listings (e.g., weather information, associated Internet web links, computer software, video clips, non-television advertisements etc.), any suitable combination of which is referred to herein as program guide data.

The main facility may also provide one or more videos to the distribution facilities. The videos may be transmitted in real time by the main facility to the distribution facilities for real-time distribution to the user television equipment of a number of users. Alternatively, the main facility may transmit videos to the distribution facilities where they are stored. The distribution facilities may later distribute the videos to the user television equipment of a number of users in real time. This approach may be referred to as a "store-and-forward" video distribution scheme. If desired, a combination of the two approaches may be used. In still another suitable store-and-forward approach, passive guide videos may be provided on storage media (e.g., laser disks, digital versatile discs (DVDs), etc.), that are provided to the distribution facilities via the mail.

The distribution facilities generate and distribute passive guide display screens containing the television programming data (e.g., program listings), other data, videos, or any suitable combination thereof as a video signal over a dedicated television channel to the television equipment of a number of viewers. In an illustrative passive guide, users are presented with videos such as promotions, trailers and informative segments in one portion of a display screen, and may be presented with program listings information in another portion of the display screen. The videos may provide users with information about television programming, related products, and other television-related subject matter. Textual information may also be displayed. The textual information may corresponds to the current video. For example, passive guides may include a near-full-screen video of a promoted program, plus a small text area with ordering details for the promoted program (e.g., a barker channel). Alternatively, it may include a quarter-screen video, accompanied by quarter screen text with ordering or viewing instructions, and a half-screen of scrolling program listings. These examples are merely illustrative, and other passive guide approaches may be used.

The videos that are displayed in the passive guide display screen may be distributed according to a playlist that is generated by the main facility, a distribution facility, or a combination of both. A distribution facility may, for example, track characteristics of the passive guide product, such as the currently displayed screen components of the passive guide display screen (e.g., videos, program listings grid, etc.), the size and location of the components, the listings that are being displayed, the period with which listings are paged or the speed with which listings are scrolled, the currently active program segment in the video portion of the guide, the content of the videos (e.g., programs or products that are promoted by a video), the channel and call letters of the passive guide, a source identifier or other identifier of the passive guide, or any other suitable information. Such characteristics or combinations of such characteristics are hereby referred to as passive guide characteristics. The passive guide characteristics may also include the playlist for the videos of the passive guide.

The distribution facilities may distribute the program guide data, playlist and other passive guide characteristics, or any suitable combination thereof, for use by an interactive program guide. The playlist and other passive guide characteristics may be provided to the interactive guide by a distribution facility as part of or separately from the program guide data normally provided to the interactive guide. The program guide may run wholly on a user's television equipment, or partially on the television equipment and partially on a program guide server. The interactive guide may overlay interactive program guide data onto the passive guide channel, or otherwise replace passive content of the passive guide with interactive content. The resulting hybrid passive-interactive guide may provide users with access to interactive content interactive guide features while the users are watching the video content of the passive guide.

The interactive program guide may use the playlist and other passive guide characteristics to enhance the display of the hybrid guide and to provide additional interactive features that may be coordinated with the passive guide display. The hybrid guide may, for example, not display listings or may scroll or page listings within an interactive portion of a hybrid guide, until a user indicates a desire to interact with the listings. When overlaying listings, the interactive guide may replace the passive listings with synchronized listings—passive or interactive listings that start at the same point in the channel lineup at which the passive listings were being displayed by the passive guide just before the synchronized listings were displayed. The type of listings (e.g., movie listings, sports listings, etc.) may be synchronized if desired. When the size of the video portion of the passive guide changes, the interactive program guide may change the size of the interactive portion or portions of the hybrid guide accordingly.

The interactive guide may also replace other types of passive guide content with interactive content. Passive guides may provide one or more passive features, such as a sports feature, in which video on a particular subject is displayed accompanied by passive information. The interactive guide may overlay the passive information with an interactive feature. Alternatively, the interactive guide may supplement a passive feature with interactive content. When, for example, the passive guide is promoting a specific product or program, the interactive guide may include a supplemental advertisement or other supplemental information for the same product or program promoted by the hybrid guide. Such advertisements may be passive or interactive. When the passive guide is displaying a video promotion for a program with associated text (e.g., channel numbers, start times, end times, etc.), the interactive guide may overlay the text with text that is more appropriate to the interactive viewers. This may be desirable when, for example, the program being promoted is available on different channels or for additional start times for viewers with advanced television equipment.

The hybrid guide may include traditional interactive guide features that relate to the promotional content in the video portion of the passive guide. The hybrid guide may, for example, have interactive components related to a video promotion that provide users with an opportunity to purchase a program or product being advertised. The hybrid guide or an interactive guide may provide users with an opportunity to view listings for segments aired in the video portion of a passive guide. The hybrid guide or an interactive guide may also provide users with an opportunity to set reminders for listings or video segments that are displayed by the passive guide and that a user is interested in.

If desired, a user's television equipment may have multiple tuners. The hybrid guide may control the multiple tuners to provide users with an opportunity to, for example, watch regular programming while recording a passive channel segment, or vice versa. Information on passive guide characteristics may also be recorded and played back.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
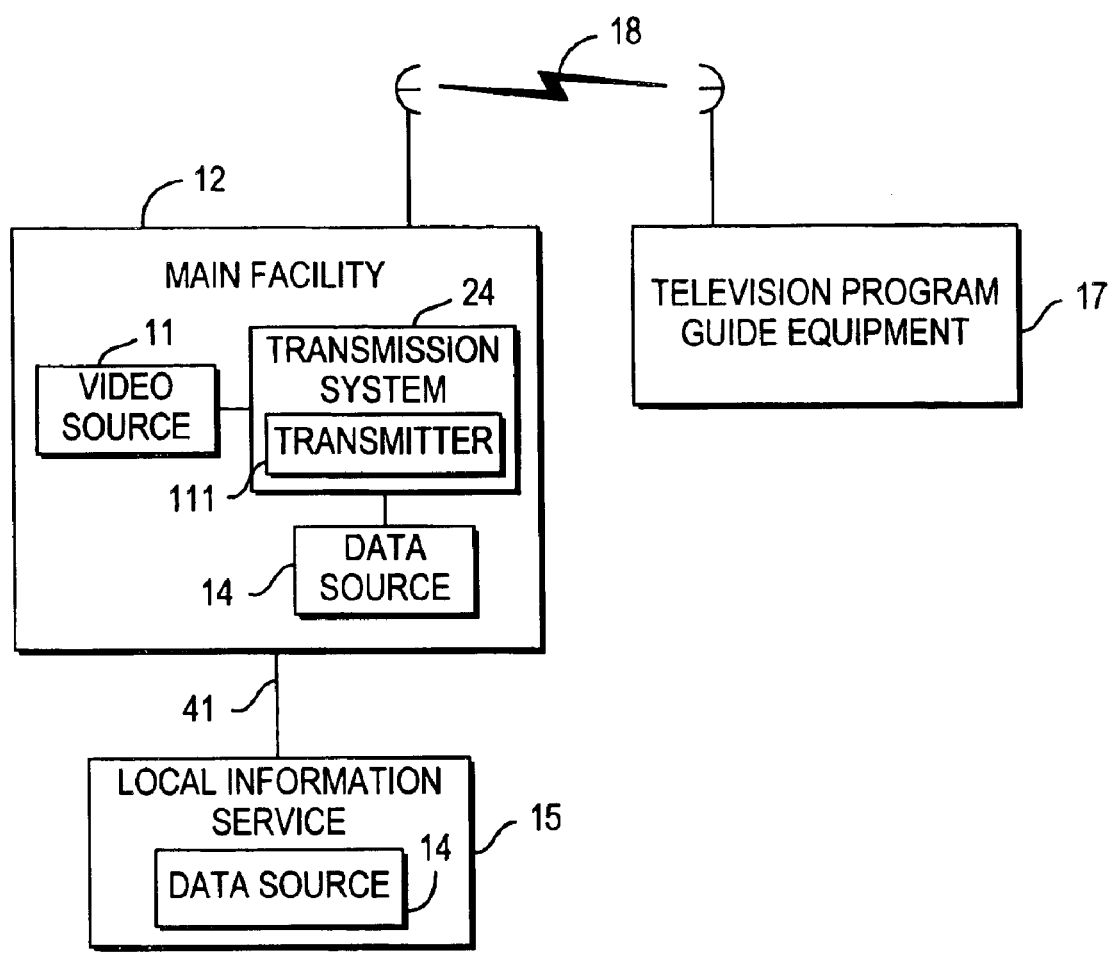
FIG. 1 is a schematic block diagram of an illustrative system in accordance with the present invention.

An illustrative system 10 in accordance with the principles of the present invention is shown in FIG. 1. Main facility 12 provides program guide data from data source 14 to television program guide equipment 17 via communications link 18. There may be multiple data sources but only one has been shown to avoid overcomplicating the drawing. If desired, program guide data sources may be located at facilities separate from main facility 12, such as at local information services 15, and may have their data provided to main facility 12 for localization and distribution. Data sources 14 may be any suitable computer or computer based system for obtaining data (e.g., manually from an operator, electronically via a computer network or other connection, or via storage media) and for putting the data into electronic form for distribution by main facility 12. Link 18 may be a satellite link, a telephone network link, a cable or fiber optic link, a microwave link, an Internet link, a combination of such links, or any other suitable communications link. If desired, one data source 14 or group of data sources may provide data for a passive and an interactive guide. Alternatively, data may be provided by a source or group of sources for each guide.

Local information service 15 may be any suitable facility for obtaining data particular to a localized region and for providing the data to main facility 12 over communications link 41. Local information service 15 may be, for example, a local weather station that measures weather data, a local newspaper that obtains local high school and college sporting information, or any other suitable provider of information. Local information service 15 may be a local business with a computer for providing main facility 12 with, for example, local ski reports, fishing conditions, menus, etc., or any other suitable provider of information. Link 41 may be a satellite link, a telephone network link, a cable or fiber optic link, a microwave link, an Internet link, a combination of such links, or any other suitable communications link.

The program guide data transmitted by main facility 12 to television program guide equipment 17 may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of television program guide equipment 17, although only one is shown in FIG. 1 to avoid over-complicating the drawing.

Program guide data may be transmitted by main facility 12 to television program guide equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility to distribution facilities are described, for example, in Gollahon et al. U.S. patent application Ser. No. 09/332,624, filed Jun. 11, 1999, which is hereby incorporated by reference herein in its entirety.

Main facility 12 may also provide videos for the passive guide to television program guide equipment 17. Videos for the passive guide may be transmitted in real-time by main facility 12 to television program guide equipment 17 for real-time distribution to the user television equipment of a number of users. Alternatively, main facility 12 may transmit or otherwise provide (e.g., on portable storage media) videos to television program guide equipment 17 for storage. Portions of television program guide equipment 17 may later distribute the videos to the user television equipment of a number of users in real-time. This approach may be referred to as a "store-and-forward" video distribution scheme. If desired, a combination of the two approaches may be used. Systems in which videos are both distributed directly in real-time and stored-and-forwarded in real-time are described, for example, in Kern et al. U.S. patent application Ser. No. 09/332,448, filed Jun. 11, 1999, which is hereby incorporated by reference herein in its entirety. The application of such an approach in a hybrid guide system is described, for example, in Knudson et al. U.S. patent application Ser. No. 09/357,941, filed Jul. 16, 1999, which is hereby incorporated by reference herein in its entirety.

Main facility 12 may distribute videos in real time or for store-and-forwarding by portions of television program guide equipment 17 using any suitable approach. As described, for example, in above-mentioned Kern et al. U.S. patent application Ser. No. 09/332,448, main facility 12 may schedule videos for distribution according to a promotional philosophy. Promotional philosophies are selection algorithms that attempt to maximize the effectiveness of promotions by selecting them for distribution during times for which expected audiences will view the promotions. An operator at main facility 12 may, for example, generate one or more promotional philosophy templates that are used by main facility 12 to generate a national playlist of promotional events. The promotional philosophy templates and national playlist may be provided to distribution facility 16 as part of the program guide data.

In approaches where alternative sources of videos are provided by main facility 12 to television program guide equipment 17, such as in the store-and-forward approach described in above-mentioned Kern et al. U.S. patent application Ser. No. 09/332,448, equipment at a distribution facility may generate a local playlist of promotional events according to the promotional philosophy templates. If the promotional events scheduled by the national playlist are unavailable or undesirable to the distribution facility, the local playlist may schedule alternative videos instead of the undesirable ones scheduled by the national playlist. The distribution facility may generate program guide display screens with the nationally selected or alternative videos and program guide data according to the local playlist. The display screens are distributed to users for viewing on their televisions.

The videos supplied by main facility 12 may include promotional videos such as short videos (i.e., videos less than three minutes in length), video trailers promoting a television program, or the like. The videos may be supplied by video source 11. Video source 11 may be based, for example, on a library of video clips stored on a video juke box (a multiple-compact disc or digital video disc storage system) or any other suitable combination of hardware and software for storing such videos. Videos may be provided in any suitable format. For example, video signals may be provided in an analog signal format using the National Television Standards Committee (NTSC) signal format or in a digital signal format such as a Moving Picture Experts Group (MPEG) format.

If desired, data source 14 and video source 14 may be combined into a single information source. This information source may provide program guide data, videos, or any suitable combination thereof. The data it provides may be used by television program guide equipment 17 to provide a passive guide, an interactive guide, or both. The videos may be used for whole screen or partial screen displays.

Program guide data and videos may be transmitted by transmission system 24 to television program guide equipment 17 via link 18. Link 18 may be a satellite link, a telephone network link, a cable or fiber optic link, a microwave link, an Internet link, a combination of such links, or any other suitable communications link. Video signals (e.g., television programs) may also be transmitted over link 18 if desired.

Transmission system 24 may include any equipment suitable for encoding the program guide data and videos and providing the encoded data and videos to transmitter 111. Transmitter 111 is preferably a digital satellite uplink transmitter, but may be any suitable analog, digital, radio frequency, optical, microwave, terrestrial, or other type of transmitter. Transmission system 24 may encode the data as, for example, component object model (COM) objects that are transmitted using an Internet based addressing scheme and Internet based transport and network protocols such as the user datagram protocol (UDP) and the Internet protocol (IP). Electronic program guide systems that transfer UDP packets and COM objects using a UDP/IP protocol stack are described in Gollahon et al. U.S. patent application Ser. No. 09/332,624, filed Jun. 11, 1999, which is hereby incorporated by reference herein in its entirety.

An interactive television program guide is implemented on television program guide equipment 17. Various architectures for interactive television program guide systems and various interactive guide features are described, for example, in above-mentioned Knudson et al. U.S. patent application Ser. No. 09/357,941, filed Jul. 16, 1999. Four illustrative arrangements for television program guide equipment 17 are shown in FIGS. 2a–2d. As shown, television program guide equipment 17 may include distribution equipment 21 located at distribution facility 16, and user television equipment 22.

Figure 2A:
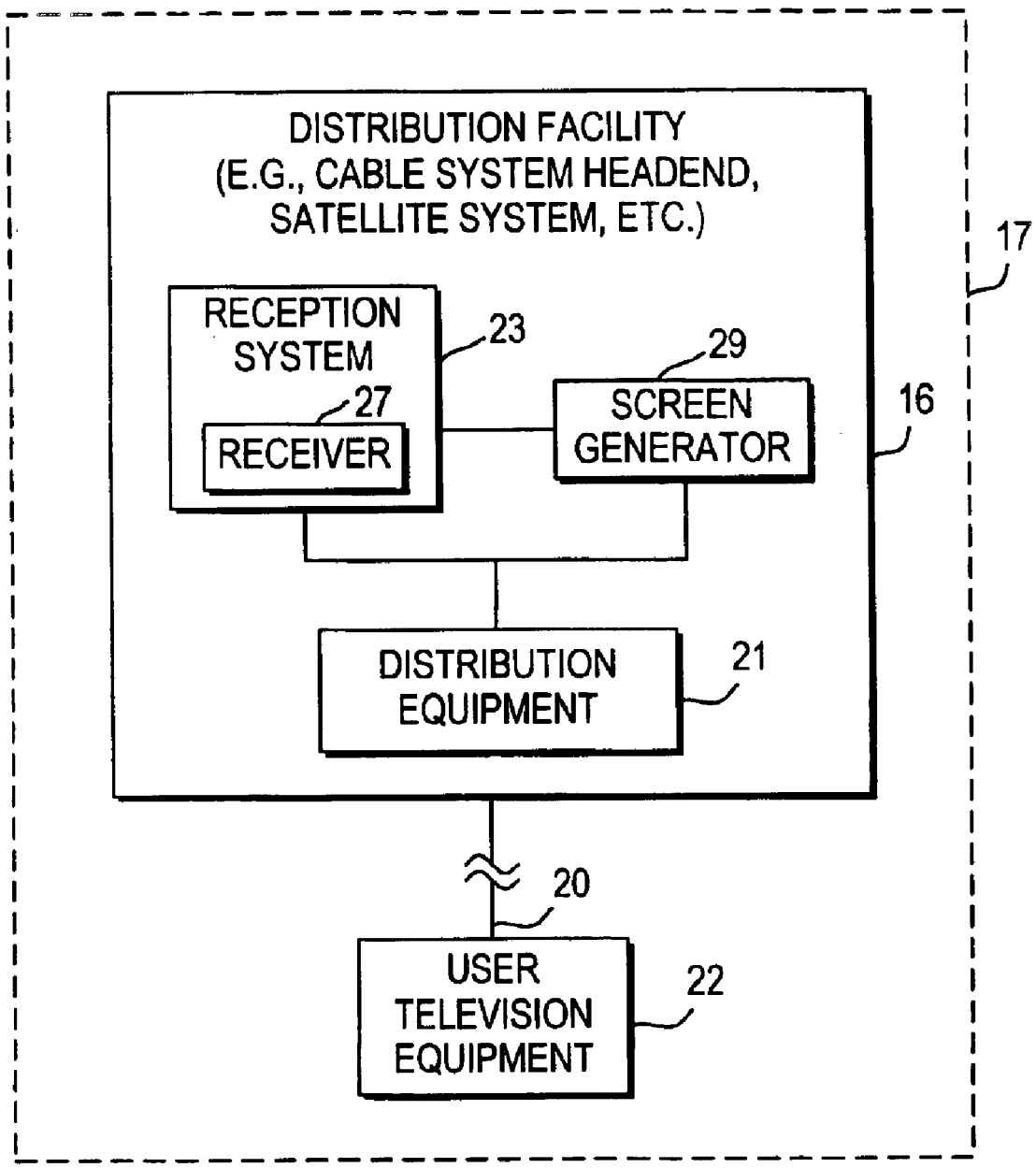
FIGS. 2a–2d show illustrative arrangements for the interactive television program guide equipment of FIG. 1 in accordance with the principles of the present invention.
Figure 2B:
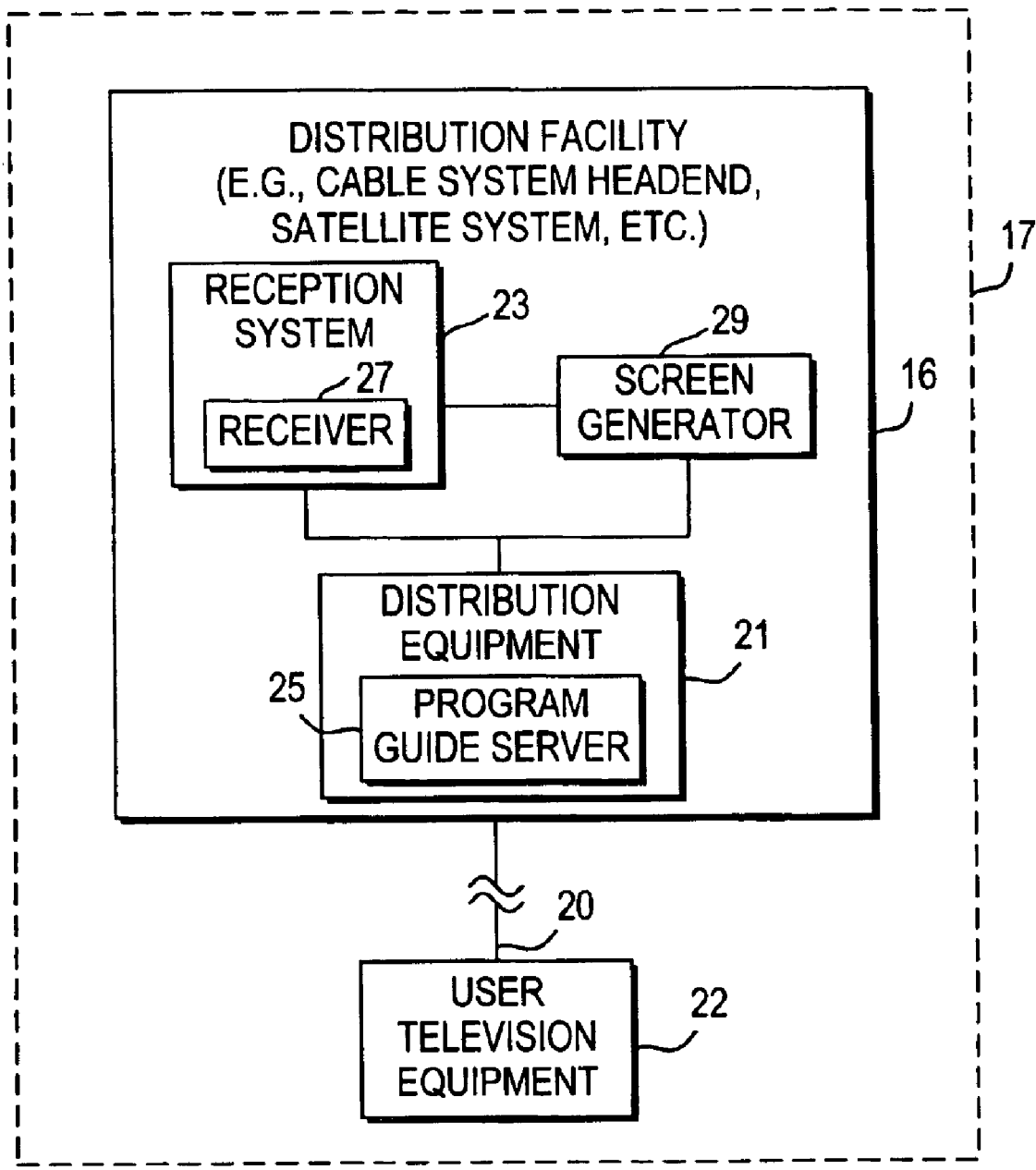
Figure 2C:
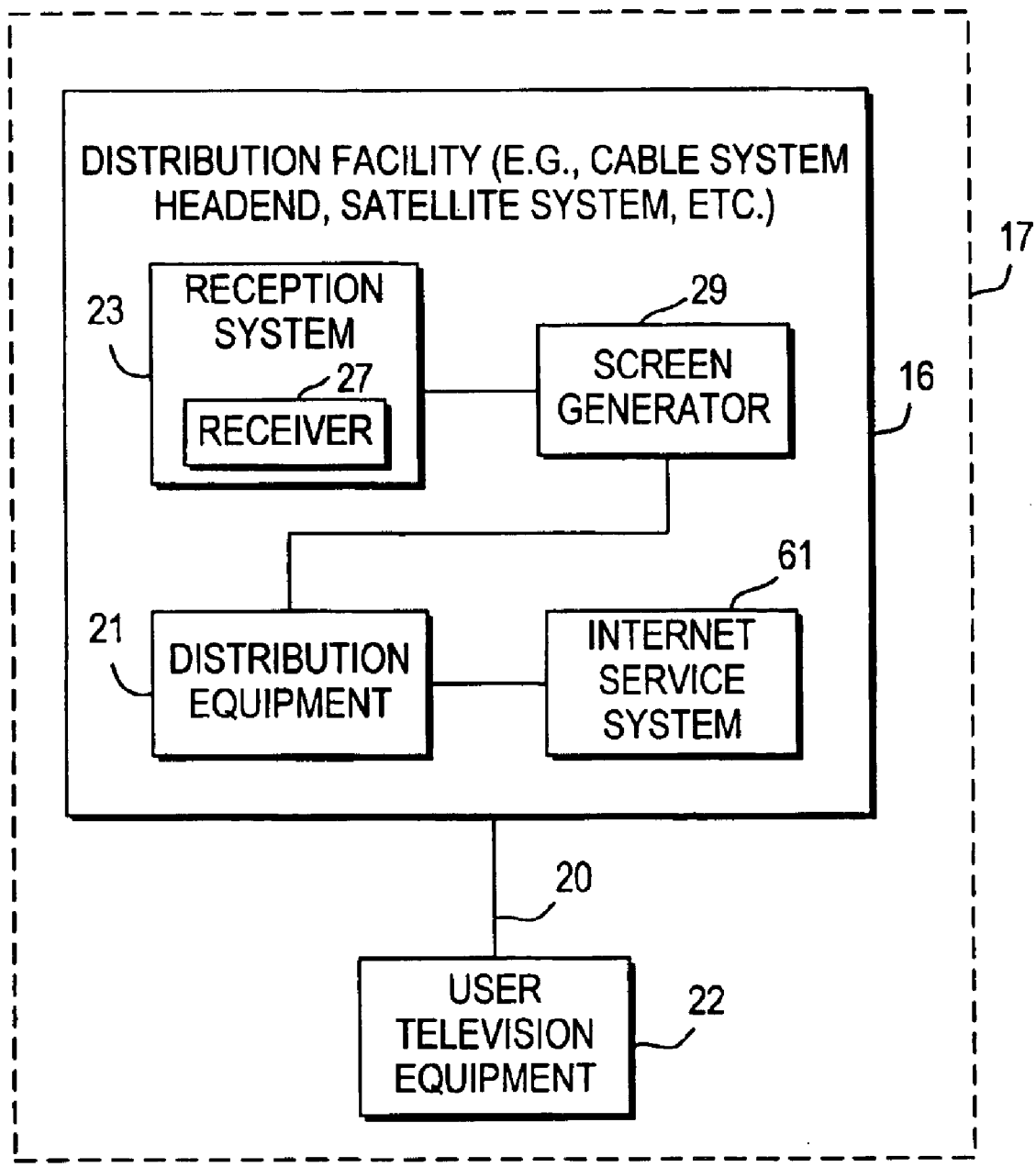
Figure 2D:
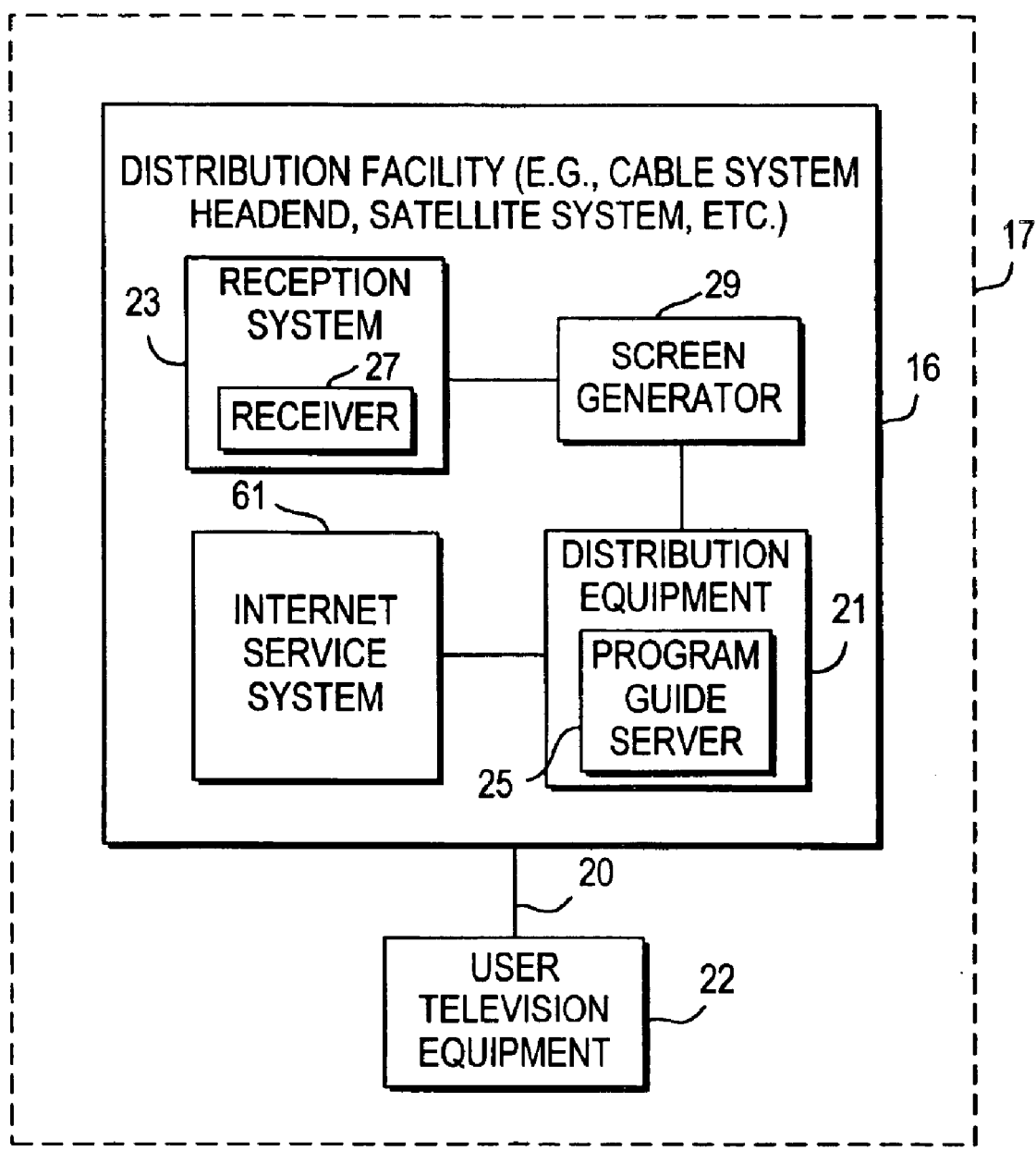

The interactive television program guide may run totally on user television equipment 22 as shown in FIGS. 2a and 2c, or may run partially on user television equipment 22 and partially on television program guide equipment 17 using a suitable client-server or distributed processing approach as shown in FIGS. 2b and 2d.

Distribution facility 16 may be any suitable distribution facility (e.g., a cable system headend, a broadcast distribution facility, a satellite distribution facility, or any other suitable type of distribution facility). Distribution facility 16 may have reception system 23 for receiving the videos, data, or a suitable combination thereof from transmitter 111 using receiver 27. Receiver 27 is preferably a digital satellite downlink receiver, but may be any suitable analog, digital, radio-frequency, optical, microwave, terrestrial, or other type of receiver.

Distribution facility 16 may have screen generator 29 for generating passive guide display screens containing the videos and data. Screen generator 29 may be implemented using any suitable hardware, software, or combination thereof. Screen generator 29, may be, for example, a Windows NT process running on a personal computer with a Pentium II microprocessor.

Screen generator 29 may use an object-oriented approach to generate video product display screens. The use of COM objects, for example, may allow changes to be made to the format and functionality of some of the features of the system without requiring changes to other system components. Such an approach may allow one main facility 12 to provide and manage a number of different passive guides and other video products from a central location. Screen generators that may be used to create video product display screens using an object-oriented approach are described, for example, in Kern et al. U.S. patent application Ser. No. 09/332,539, filed Jun. 11, 1999, which is hereby incorporated by reference herein in its entirety.

Screen generator 29 may track passive guide characteristics such as the currently displayed screen components of the passive guide display screen (e.g., videos, program listings grid, etc.), the size and location of the components, the listings that are being displayed, the period with which listings are paged or the speed with which listings are scrolled, which program segment is currently active in the video portion of the guide, the content of the videos (e.g., programs or products that are promoted by a video), the channel and call letters of the passive guide, a source identifier or other identifier of the passive guide, or any other suitable information. If desired, local or national playlists may also be provided to the interactive guide as part of the passive guide characteristics. The passive guide characteristics may be provided to distribution equipment 21 or program guide server 25 of FIGS. 2b and 2d for use by the interactive television program guide. The passive guide characteristics may be provided to the guide or a guide client periodically, continuously, on-demand, or with any other suitable frequency based on the system architecture underlying the guide.

Screen generator 29 may track passive guide characteristics using any suitable approach. Screen generator 29 may be implemented using, for example, an object oriented approach in which display element objects (e.g., video objects, grid objects, text objects, etc.) render themselves to a display screen. The display item objects may render themselves with styles and at positions on the display screen that are defined within the display elements themselves or that are inherited based on predefined style packages. Style inheritance in a promotional material distribution system is described, for example, in above-mentioned Kern et al. U.S. patent application Ser. No. 09/332,539, filed Jun. 11, 1999. Each display item object may include methods for obtaining passive guide characteristics from the object.

A recorder object may be implemented, for example, with methods that query each display item object for its relevant characteristics (e.g., style, position, content, etc.). The recorder object may maintain the characteristics in a database. The passive guide characteristics may be recorded each time a display object is rendered to a display screen. Alternately, screen generator 29 may record the characteristics in advance of screen generation according to, for example, a national or local playlist. In still another suitable approach, main facility 12 may provide the characteristics to distribution facility 16 according to the national playlist before videos are displayed by screen generator 29.

Distribution equipment 21 may distribute the passive guide display screens on a dedicated channel and, if desired, television programming on multiple analog or digital channels, to multiple users via communications paths 20. Distribution equipment 21 may include, for example, a cable headend modulator, and may include any other or additional equipment suitable for transmitting television programming and passive guide display screens over communications paths 20. Alternatively, distribution equipment 21 may include suitable hardware and software for delivering videos in real-time or substantially real-time via the Internet (e.g., using the M-bone). If desired, television programming and video products may be provided over separate communications paths.

Distribution equipment 21 of FIGS. 2a, 2b, 2c, and 2d may also include suitable hardware for providing program guide data and passive guide characteristics, or any suitable combination thereof, to user television equipment 22 over communications path 20. Distribution equipment 21 may include, for example, suitable transmission hardware for distributing program guide data on a television channel sideband, in the vertical blanking interval of a television channel, using an in-band digital signal, using an out-of-band digital signal, or by any other suitable data transmission technique. The data may, for example, be provided over a phone line when communications path 20 include separate paths for data and television signals.

The program guide data and passive guide characteristics may be provided to the guide continuously or periodically. If desired, the passive guide characteristics may be provided simultaneously with the program guide data, or ahead of the program guide data. The passive guide characteristics may be provided synchronously with the content of the passive guide. Alternatively, passive guide characteristics may be provided ahead of corresponding displays of the passive guide, with indications of how far in advance guide characteristics of the passive guide will occur. In the latter approach, multiple messages may be sent indicating when characteristics of the passive guide will occur. This may allow the interactive guide to compensate for variable time differences between the passive and interactive guide, and for latencies in communication paths.

Communications path 20 may be any communications path or paths suitable for distributing program guide data. Communications path 20 may include, for example, a satellite link, a telephone network link, a cable or fiber optic link, a microwave link, an Internet link, a data-over-cable service interface specification (DOCSIS) link, a combination of such links, or any other suitable communications link. Communications path 20 preferably has sufficient bandwidth to allow distribution facility 16 to distribute television programming to user television equipment 22. There are typically multiple pieces of user television equipment 22 and multiple associated communications paths 20, although only one piece of user television equipment 22 and communications path 20 are shown in FIGS. 2a–2d to avoid over complicating the drawings. If desired, television programming may be provided over separate communications paths (not shown).

FIG. 2b shows an illustrative arrangement for television program guide equipment 17 in a client-server based or distributed interactive program guide system. As shown in FIG. 2b, distribution equipment 21 may include program guide server 25. Program guide server 25 may be any suitable software, hardware, or combination thereof for providing a client-server based program guide. Program guide server 25 may, for example, run a suitable database engine (e.g., SQL Server by Microsoft) and provide program guide data, passive guide characteristics, or any suitable combination thereof in response to queries generated by a program guide client implemented on user television equipment 22. Alternatively, program guide server 25 may poll the program guide client and provide data when necessary. If desired, program guide server 25 may be located at main facility 12 or some other location (not shown).

A program guide client running on user television equipment 22 may retrieve program guide data, passive guide characteristics, or any suitable combination thereof, from program guide server 25 using any suitable client-server based approach. The program guide client may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach.

In another approach, program guide display pages may be generated at distribution facility 16 using a high-end graphics engine or video production equipment. The display pages are then encoded into an MPEG or other suitable digital format for distribution. The program guide display pages may be decoded by a thin program guide client running on user television equipment 22 to produce program guide display screens seen by the user. Client-server based program guides of this type are described, for example, in Marshall et al. U.S. patent application Ser. No. 09/330,501, filed Jun. 11, 1999, which is hereby incorporated by reference herein in its entirety.

The program guide client may communicate with program guide server 25 over communications path 20 using any suitable network and transport layer protocols, if desired. A protocol stack may be used which includes, for example, Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, or any other suitable network and transport layer protocols. If desired DOCSIS may also be used.

FIGS. 2c and 2d show illustrative Internet based interactive television program guide systems. Distribution facility 16 may, for example, include Internet service system 61. Internet service system 61 may use any suitable combination of hardware and software capable of obtaining or providing program guide data, passive guide characteristics, or any suitable combination thereof, for or to the guide using an Internet based approach (e.g., the HyperText Transfer Protocol (HTTP)). If desired, Internet service system 61 may be located at a facility that is separate from program guide distribution facility 16.

If the program guide is implemented on user television equipment 22 of television program guide equipment 17 as shown in FIG. 2c, Internet service system 61 (or other suitable equipment at program guide distribution facility 16 that is connected to Internet service system 61) may provide program guide data, passive guide characteristics, or any suitable combination thereof, to user television equipment 22 via the Internet, or via distribution equipment 21 using any suitable Internet-based approach (e.g., using the HyperText Transfer Protocol (HTTP) or File Transfer Protocol (FTP) over a Transmission Control Protocol/Internet Protocol (TCP/IP) type link). If the program guide implemented on television program guide equipment 17 is a client-server guide as shown in FIG. 2d, program guide server 25 may obtain program guide data or passive guide characteristics from Internet service system 61. Alternatively, the data may be provided by main facility 12 to distribution facility 16 via the Internet and Internet service system 61. The program guide data may be distributed by distribution equipment 21 to the guide using any suitable distribution scheme.

In still another embodiment, distribution equipment 21 may include suitable hardware (not shown) on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between distribution facility 16 and user television equipment 22.

The passive guide display screens may include any suitable combination of videos, listings, text, graphics and other content. For example, passive guides may include a near-full-screen video of a promoted program, plus a small text area with ordering details for the promoted program (e.g., a barker channel). Alternatively, it may include a quarter screen video, accompanied by quarter screen text with ordering or viewing instructions, and a half-screen of scrolling program listings. These examples are merely illustrative, and other passive guide approaches may be used.

Figure 3A:
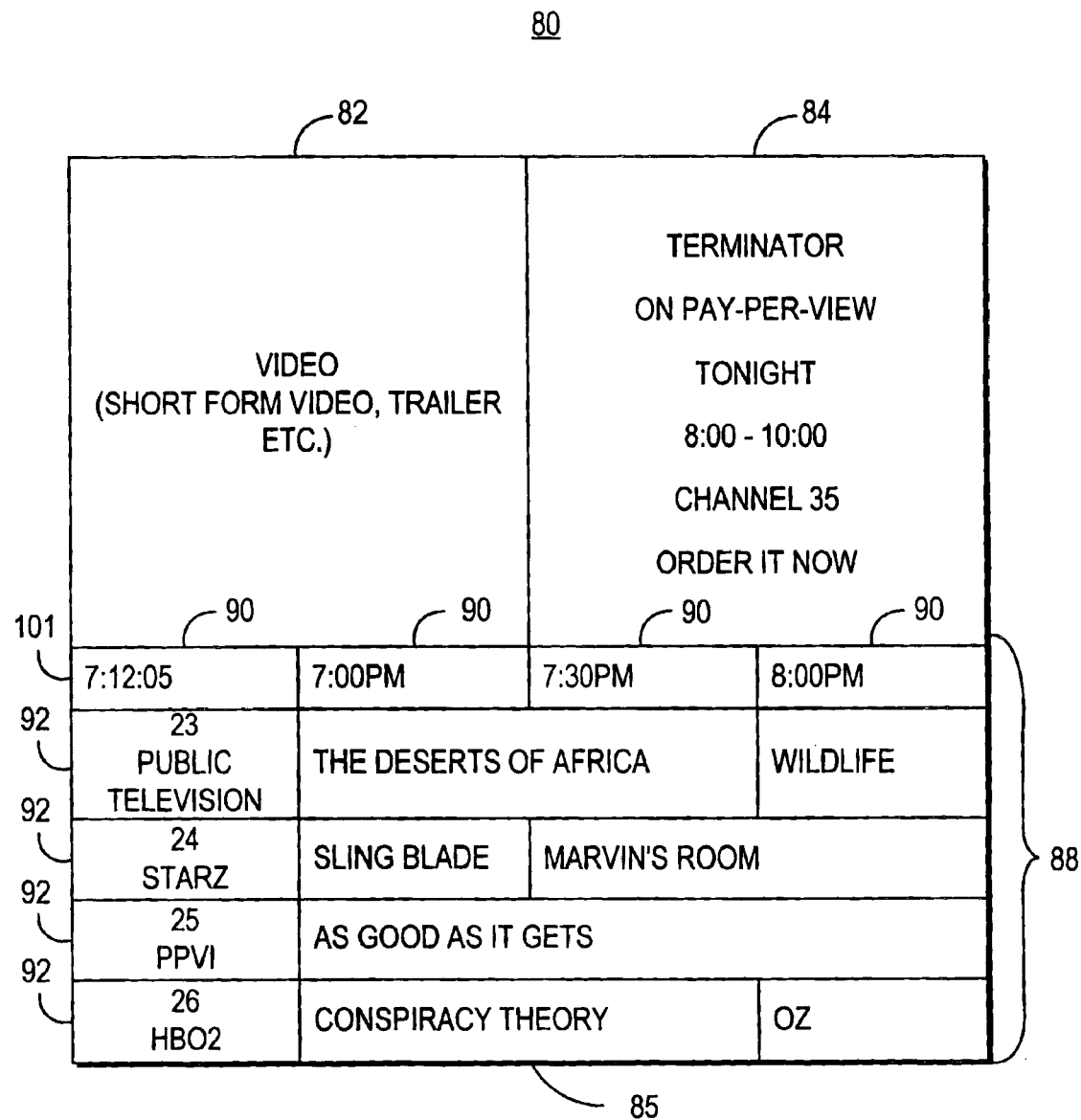
FIGS. 3a and 3b are two illustrative display screens for a passive television program guide.
Figure 3B:
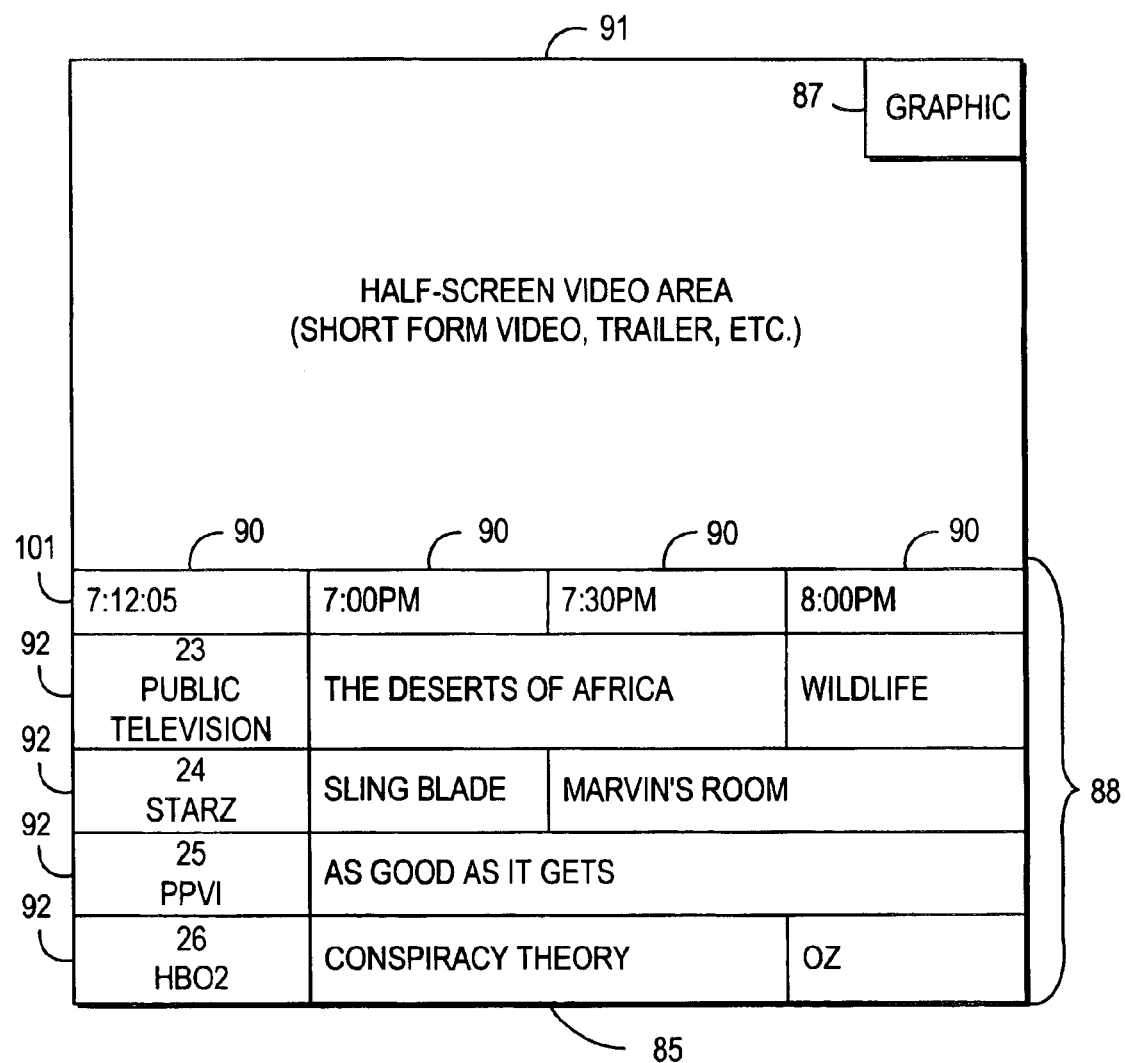

Two suitable illustrative passive guide display screens are shown in FIGS. 3a–3b. Passive guide display screens may be divided into one or more display areas. The display areas may, for example, include video display areas, graphic display areas, text display areas, program listings areas, or any suitable combination thereof. Video display areas may display video promotional material. They may, for example, provide a video clip of a pay-per-view selection being promoted, such as a video clip of the movie Terminator. Text display areas may display text describing the promotional video ("tagging" information). Program listings areas may display television program listings in any suitable format, such as any suitable list, table, or grid.

Display areas may be sized to occupy predefined portions of the screen. They may, for example, be sized to fit in the right or left quarter of the screen, in the top or bottom half of the screen, in the top or bottom one-third of the screen, in the top or bottom two-thirds of the screen, as a full screen, etc. Display areas may display promotional events that correspond to the display area type (e.g., text, video, program listings, etc.).

FIG. 3a shows one suitable combination of display areas for an illustrative passive television program guide. Illustrative passive guide display screen 80 may include, for example, video display area 82, text display area 84, and program listings area 85. Video display area 82 may be sized, for example, to fit in the top left quarter of the display screen. Video display area 82 may display video clips, such as promotions, short form videos, and trailers to provide users with information about television programming, related products, and other television-related subject matter. In this example, video display area 82 is displaying a video clip of the movie Terminator. Text display area 84 may be sized, for example, to fit in the top right quarter of the screen and may be used to display tagging information about, for example, when Terminator airs and on what channel it airs. Video display area 82 and text promotion area 84 may be switched if desired.

FIG. 3a also illustrates the display of program listings grid 88 in program listings area 85. Program listings area 85 has been sized, for example, to fit in the bottom half of the screen. The sizes of the video, text and listings portion may change during the course of the passive guide's display. Program listings grid 88 may be divided into a number of columns 90 which correspond to program broadcast times and which may be equally spaced apart (e.g., in thirty-minute steps), and a number of rows 92 where each row 92 corresponds to a different channel. Program listings grid 88 may be scrolled continuously or have its pages changed periodically to display program listings for additional channels. Program listings may be displayed in the grid in sub-sets according to one or more organization criteria and sorted in various ways. The current time may be displayed by clock 101. Another suitable illustrative display screen for a passive guide is shown in FIG. 3b. Passive guide display screen 81 of FIG. 3b may be an alternative display mode for the screen of FIG. 3a. Passive guide display screen 81 of FIG. 3b may include, for example, video display area 91, graphic display area 87 and program listings area 85. Video display area 91 may, for example, be sized to fit in the top-half portion of passive guide display screen 81. Graphic display area 87 may include a still or animated graphic, such as a brand logo. Graphic display area 87 may be omitted if desired.

Promotional material display screens 80 and 81 of FIGS. 3a–3b are only illustrative, and any suitable combination and arrangement of display areas may be used by system 10 to provide a number of different video products with different video product display screens that differ in appearance.

Figure 4:
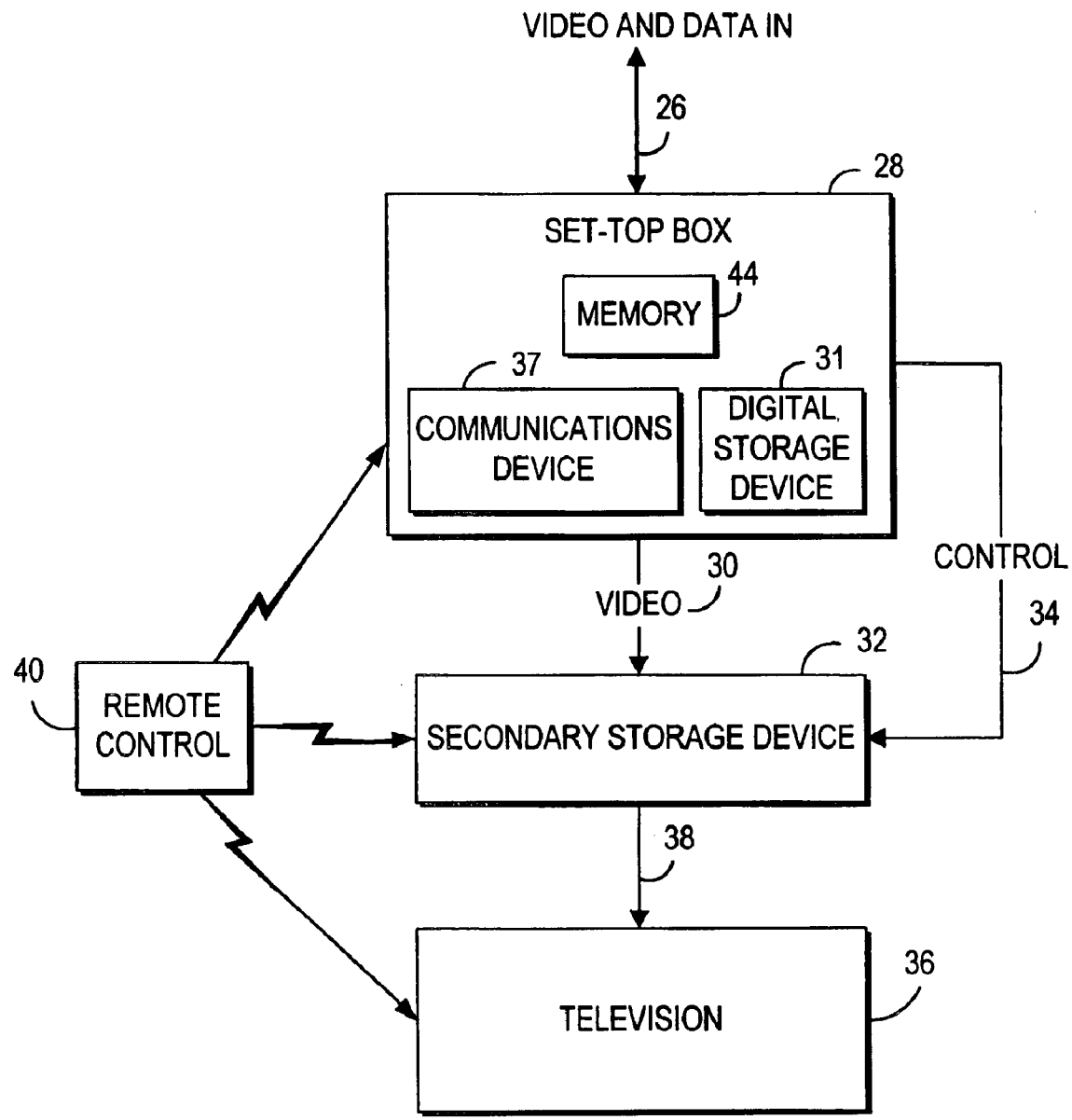
FIG. 4 is an illustrative schematic block diagram of a user television equipment of FIGS. 2a–2d in accordance with the principles of the present invention.

An illustrative arrangement for user television equipment 22 is shown in FIG. 4. User television equipment 22 of FIG. 4 receives video signals and data from distribution facility 16 or program guide server 25 at input 26. During normal television viewing, a user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide may run on set-top box 28, on television 36 (if television 36 has suitable processing circuitry and memory), on a suitable analog or digital receiver connected to television 36, or on digital storage device 31 if digital storage device 31 has suitable processing circuitry and memory. The interactive television program guide may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to an infrared receiver in the videocassette recorder that normally accepts commands from a remote control such as remote control 40. Remote control 40 may be used to control set-top box 28, secondary storage device 32, and television 36.

If desired, a user may record programs, program guide data, passive guide videos, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. Digital storage device 31 may, for example, be contained in a local media server. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which a user has tuned with set-top box 28. Video signals may also be provided to television 36 by set-top box 28 when set-top box 28 is used to play back information stored on digital storage device 31.

Set-top box 28 may have memory 44. Memory 44 may be any memory or other storage device, such as a random access memory (RAM), read only memory (ROM), flash memory, a hard disk drive, a combination of such devices, etc., that is suitable for storing program guide application instructions, program guide data, and passive guide characteristics for use by the program guide.

In client-server based approaches, set-top box 28 may have communications device 37 for communicating directly with program guide server 25 or Internet service system 61 over communications path 20. Communications device 37 may be a modem (e.g., any suitable analog or digital standard, cellular, or cable modem), network interface card (e.g., an Ethernet card, Token ring card, etc.), or other suitable communications device. Communications device 37 may also be a personal computer with an Internet connection in, for example, the arrangement shown in FIGS. 2c and 2d. Television 36 may also have such a suitable communications device if desired. In an alternative approach, user television equipment 22 may communicate with Internet service system 61 via distribution equipment 21 using a suitable return path.

Figure 5:
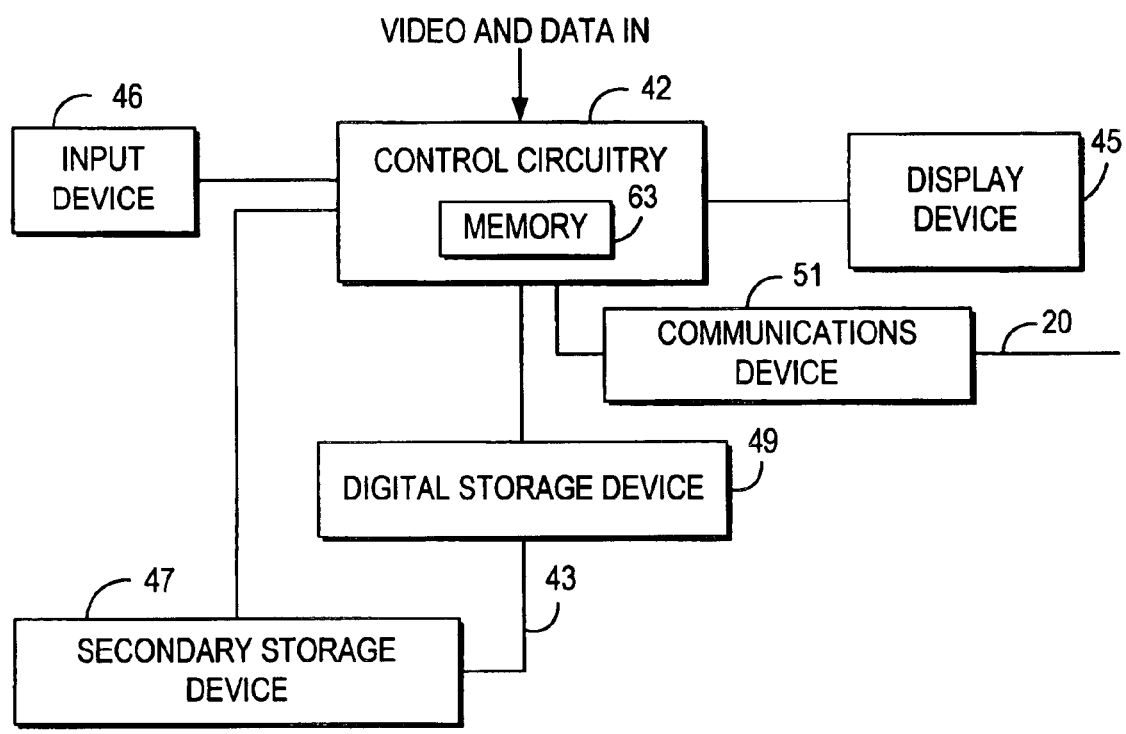
FIG. 5 is a generalized schematic block diagram of portions of the illustrative user television equipment of FIG. 4 in accordance with the principles of the present invention.

A more generalized embodiment of user television equipment 22 of FIG. 4 is shown in FIG. 5. As shown in FIG. 5, program guide data from distribution facility 16 (FIG. 1) is received by control circuitry 42 of user television equipment 22. The functions of control circuitry 42 may be provided using the set-top box arrangement of FIGS. 2a and 2b. Alternatively, these functions may be integrated into an advanced television receiver, personal computer television (PC/TV), or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing program guide application instructions and program guide data for use by control circuitry 42.

User television equipment 22 of FIG. 4 may also have communications device 51 for supporting communications between the program guide and distribution equipment 21, program guide server 25, or Internet service system 61 via communications path 20. Communications device 51 may be a modem (e.g., any suitable analog or digital standard, cellular, or cable modem), network interface card (e.g., an Ethernet card, Token ring card, etc.), or other suitable communications device.

A user controls the operation of user television equipment 22 with user input device 46. User input device 46 may be a pointing device, wireless remote control, keyboard, touchpad, voice recognition system, or any other suitable user input device. To watch television, a user instructs control circuitry 42 to display a desired television channel on display device 45. Display device 45 may be any suitable television, monitor, or other suitable display device. To access the functions of the program guide, a user instructs the program guide implemented on television program guide equipment 17 to generate a main menu or other desired program guide display screen for display on display device 45.

The hybrid guide may provide users with any number of interactive guide features while simultaneously providing users with the video portion of a passive guide. Any suitable interactive guide feature may be provided to replace portions of the passive guide or to supplement the passive guide. Interactive guide features may be coordinated with the contents of the passive guide based on the playlists and other passive guide characteristics provided to the interactive guide.

A hybrid guide may be generated automatically when user television equipment 22 tunes to the passive guide channel. User television equipment 22 may tune to the passive guide channel with remote control 40 (FIG. 4), or under the control of the interactive television program guide. The interactive guide may direct control circuitry 42 to tune to the passive guide channel when, for example, the user enters the channel number of the passive guide directly, or when the user flips channels until control circuitry 42 tunes to the passive guide channel. In still another approach, the user may access the passive guide directly by pressing a suitable key on user input device 46, or by selecting an on-screen option when in the interactive television program guide.

The hybrid guide may be generated by the interactive guide using any suitable overlay technique to overlay program listings display areas, text display areas, graphic display areas, video display areas, or interactive feature areas onto the passive guide display screen. Interactive feature areas may include any suitable interactive program guide feature and may replace or supplement a passive feature of the passive guide. The interactive guide may generate the hybrid guide immediately when a user tunes to the passive guide channel. Alternatively, the interactive guide may wait to generate the hybrid guide until the user indicates a desire to access interactive features with user input device 46.

The interactive guide may, for example, overlay a passive listings display area (e.g., program listings areas 85 of FIGS. 3a and 3b) with an interactive listings area in response to a user indicating a desire to select a program listing by, for example, pressing an arrow key on remote control 40. The interactive guide may determine the first program listing displayed based, for example, on the passive guide characteristics, and may display the interactive listings starting with that first program listing. The interactive guide may, for example, determine the current time slot and channel for which listings are displayed by the passive guide based, for example, on the passive guide characteristics, and may display interactive listings for the same time slot and channel, thereby starting the interactive listings with the same listing as the passive listings. In still another suitable approach, the interactive guide may determine the type of listings displayed (e.g., whether they are movie listings, spots listings, etc.), and display interactive listings for the same type.

Figure 6:
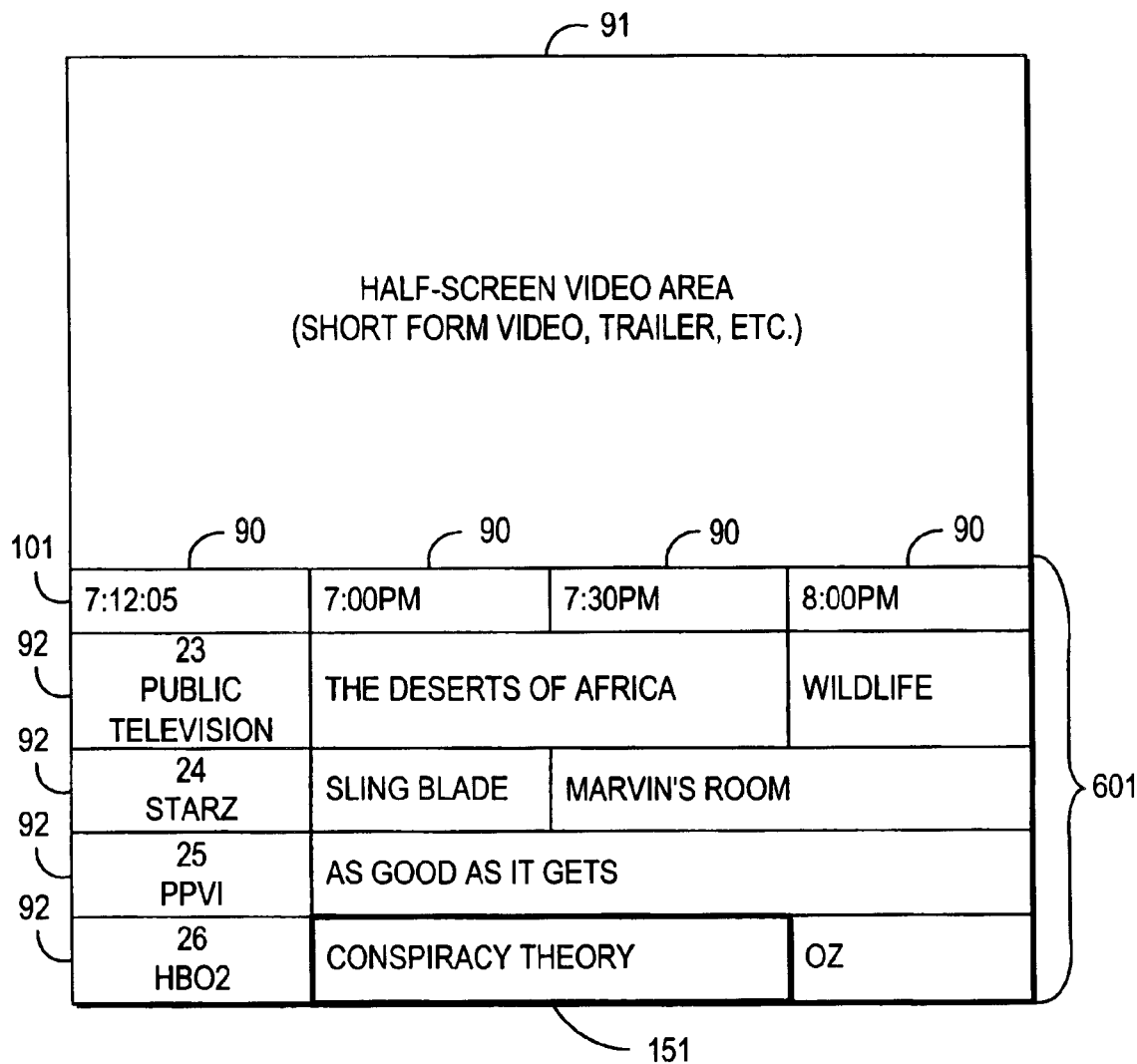
FIG. 6 is an illustrative hybrid guide display screen in which an interactive program listings grid is overlaid onto a passive program listings grid in accordance with the principles of the present invention.

The interactive guide may indicate to a user that a hybrid guide is active by, for example, displaying a highlight region in a program listings display area. FIG. 6 shows an illustrative hybrid guide having interactive grid 601 and highlight region 151. The user may position highlight region 151 by entering appropriate commands with user interface 26. For example, if user input interface 46 has a keypad, the user can position highlight region 151 using "up," 120 "down," "left," and "right" cursor keys. Program listings may also be panned left, right, up, and down by positioning highlight region 151 using the cursor keys on user input device 46. Alternatively, a touch sensitive screen, trackball, voice commands, or other suitable device may be used to move highlight region 151 or to select program listings without the use of highlight region 151. In still another approach, the user may speak the title of a television program listing into a voice request recognition system which will issue an appropriate command or request to the interactive guide. Any other suitable approach may also be used.

After a user selects a program listing, the interactive program guide may provide the user with an opportunity to access a number of program guide features. For example, the user may access additional information (typically text or graphics, but possibly video if desired) about the listing, schedule an associated program reminder, or schedule an associated program for recording by one or more of digital storage device 49 (FIG. 5), secondary storage device 47 (FIG. 5), or program guide server 25. Systems in which programs are remotely recorded on servers are described, for example, in Ellis et al. U.S. patent application Ser. No. 09/332,244, filed Jun. 11, 1999, which is hereby incorporated by reference herein in its entirety.

Figure 7:
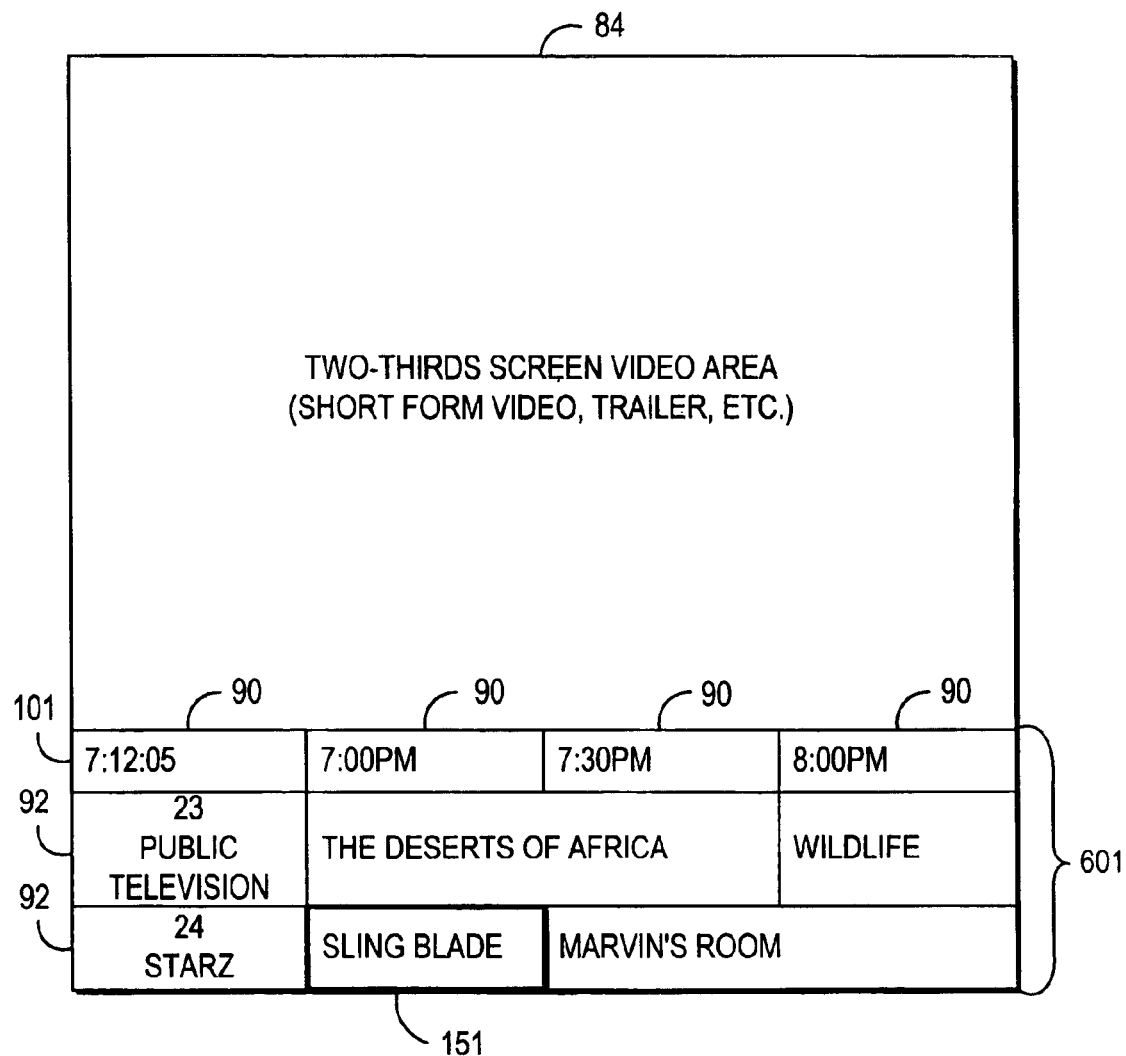
FIG. 7 is an illustrative hybrid guide display screen in which the interactive program listings grid of FIG. 6 has been resized to accommodate a change in size of the video portion of the hybrid guide in accordance with the principles of the present invention.

The sizes of the different display areas of a passive guide may change during their lifetimes. A display screen having a half-screen video display area and a half-screen listings area may have its display areas resized, for example, to a two-thirds screen video display area and a one-third screen program listings area. The passive guide characteristics may indicate that the sizes of the display areas will change or have been changed. The interactive guide may resize an interactive program listings display area, or other display area, accordingly. An illustrative display screen in which an interactive program listings area has been resized is shown in FIG. 7.

Figure 8A:
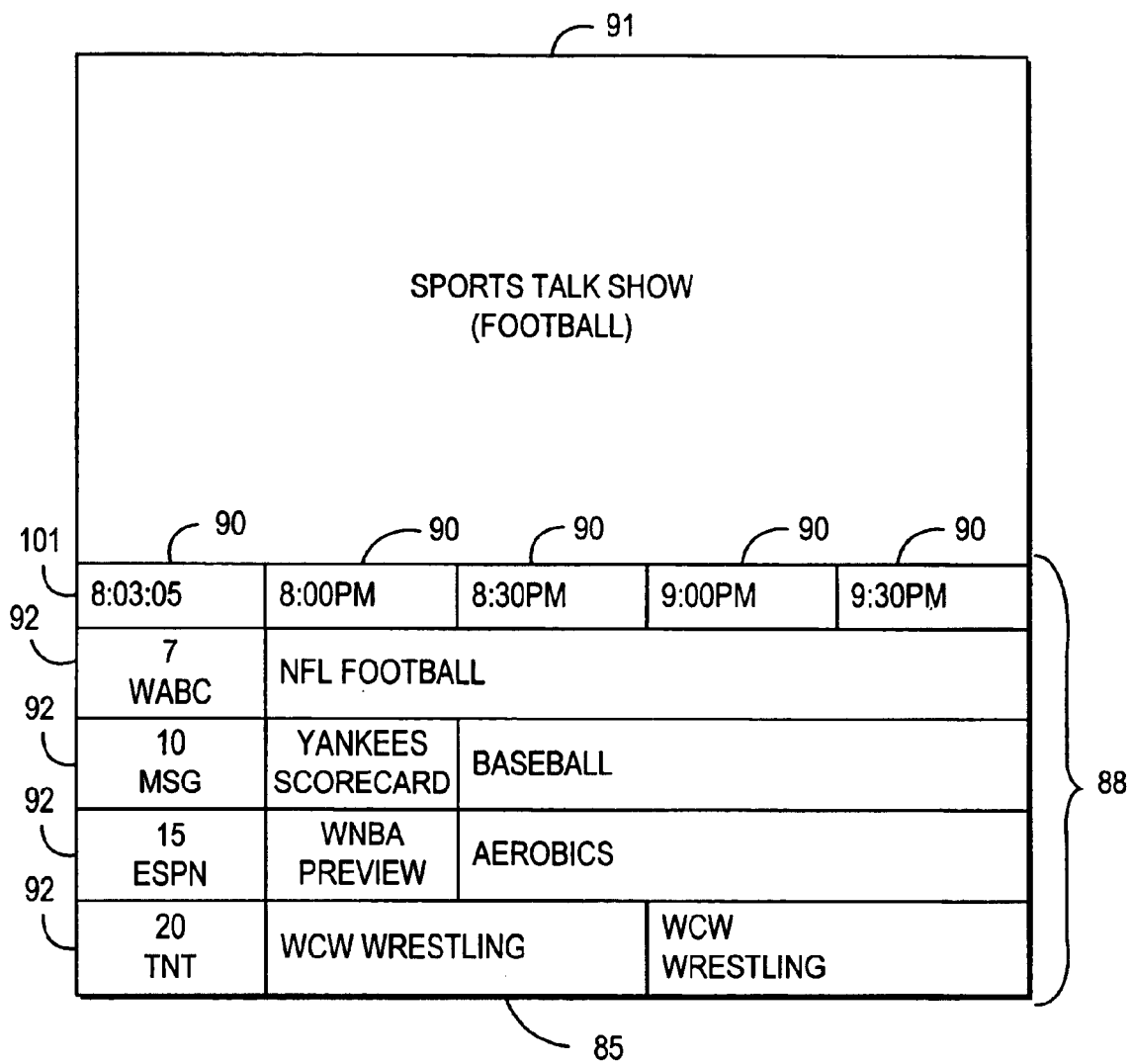
FIG. 8a is an illustrative passive guide sports feature.

The interactive guide may replace any other passive content of the passive guide with interactive content. Passive guides may include one or more features in which video for a particular subject is displayed accompanied by information related to the subject. For example, the passive guide may include a passive sports feature as shown in FIG. 8a. The sports feature may include, for example, a video display area for displaying a sports talk show, an a program listings are in which only program listings for sports are displayed. The passive guide characteristics, playlists, or both, may indicate when the passive guide displays the sports feature and its corresponding video. If desired, the characteristics may indicate the content of the video, such as the type of sports that are being discussed. In this example, the video display area is displaying a talk show about football.

Figure 8B:
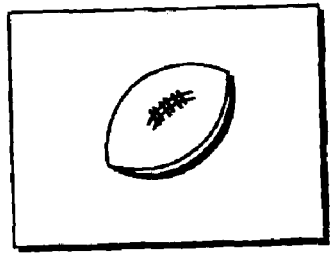
FIG. 8b is an illustrative hybrid guide display screen in which the passive sports feature of FIG. 8a is overlaid by an interactive sports feature in accordance with the principles of the present invention.

Based on the passive guide characteristics, playlists, or both, the interactive guide may determine that a football talk show feature is being displayed and may overlay the passive sports listings with an interactive sports feature as shown in FIG. 8b. If desired, the interactive feature may run wholly on user television equipment 22. Alternatively, the interactive guide may launch a web browser and automatically access a web site, as shown in FIG. 8b.

Figure 9A:
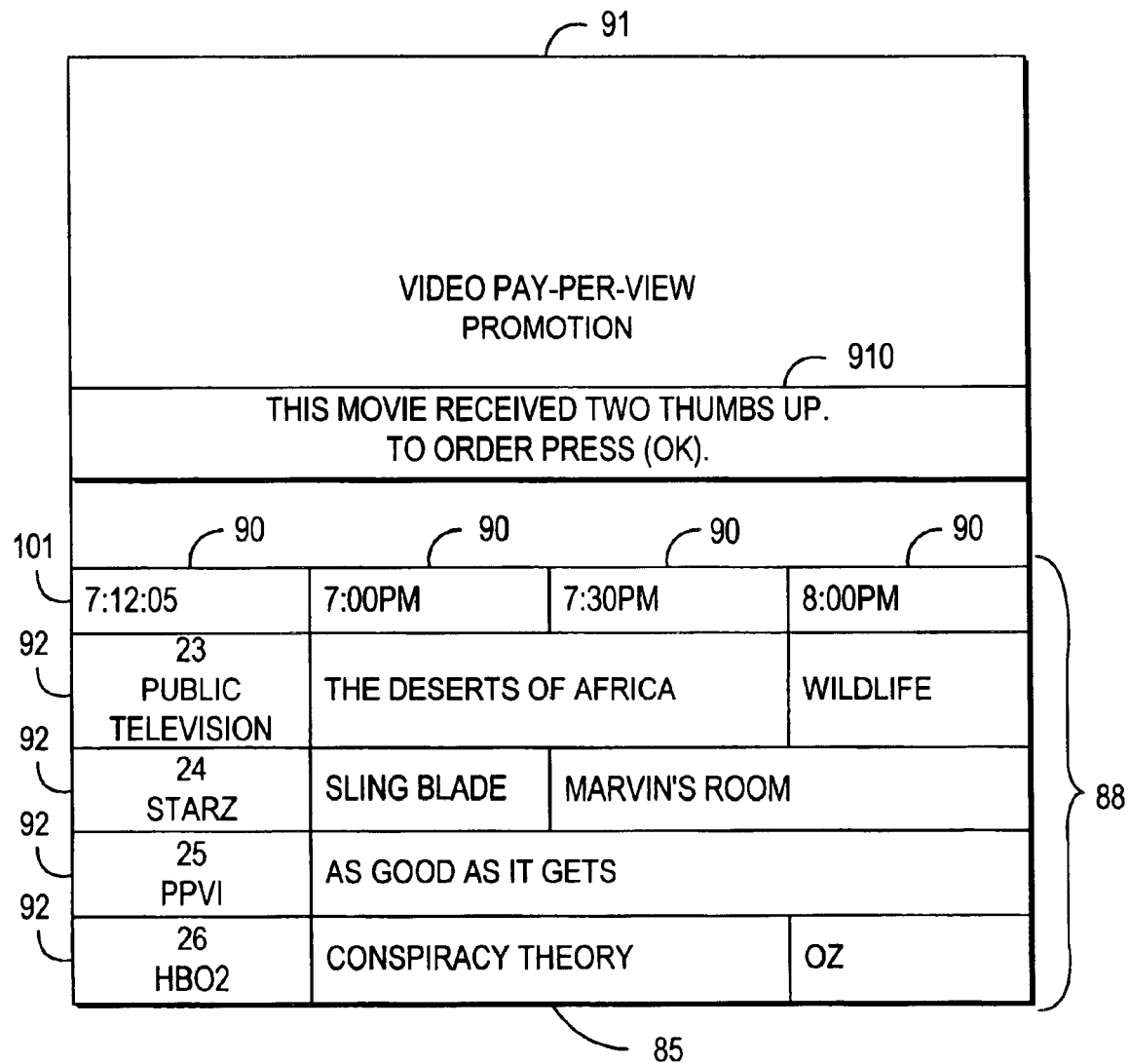
FIGS. 9a and 9b are illustrative hybrid guide display screens in which the passive guide portion of the hybrid guide is overlaid with an interactive advertisement in accordance with the principles of the present invention.
Figure 9B:
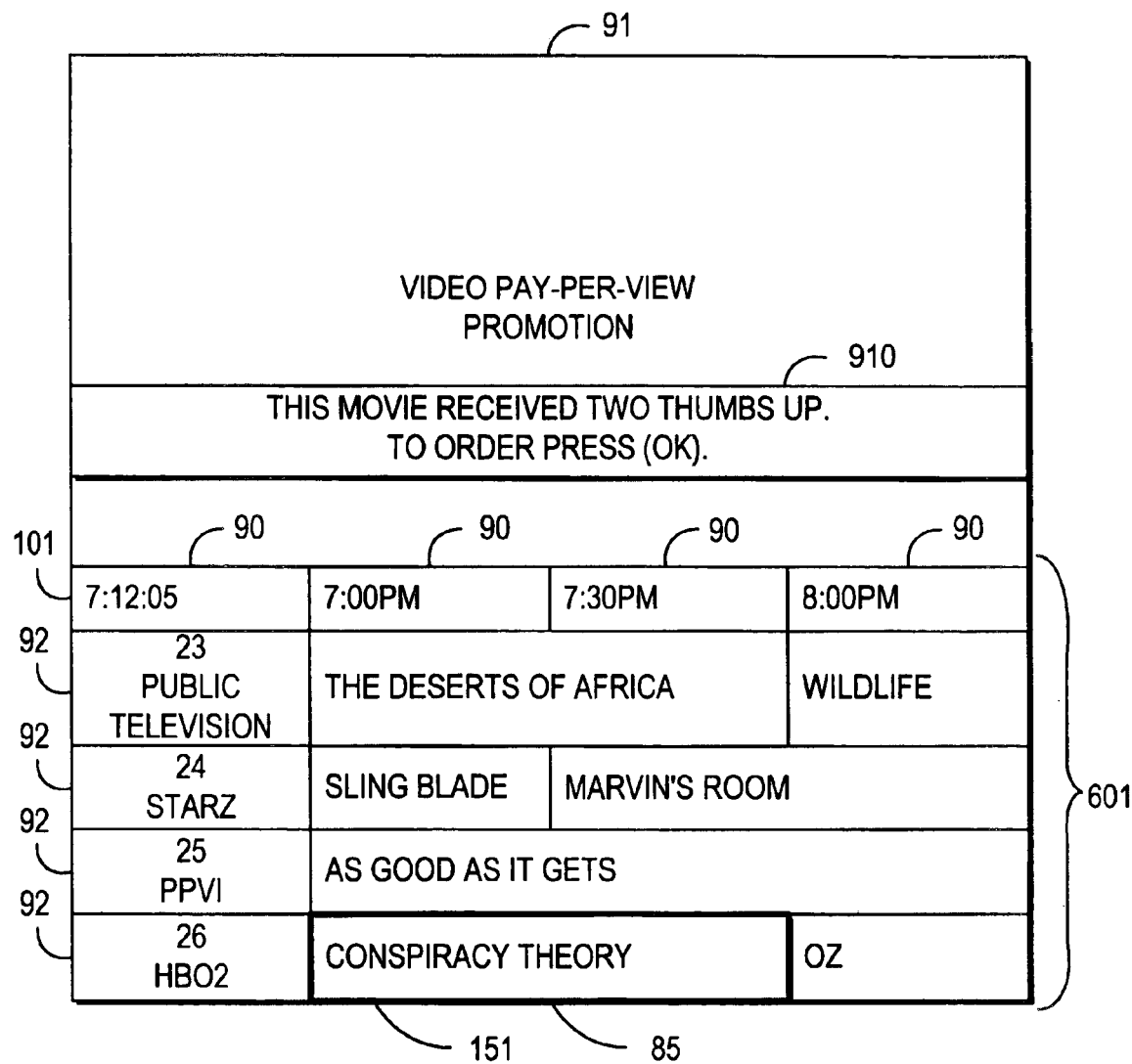

The interactive guide may supplement passive content of a passive guide with interactive content. For example, the interactive guide may determine, based on the playlists or other passive guide characteristics, that the passive guide is promoting a specific product or program. The interactive guide may overlay a supplemental advertisement or other supplemental information for the same product or program onto the passive guide display screen. The interactive guide may include such advertisements or information in a graphic display area, such as graphic display area 87 of FIG. 3b, but any suitable display area and overlay relationship may be used. FIGS. 9a and 9b show illustrative display screens in which an interactive advertisement banner 910 is overlaid onto video display area 91. In FIG. 9a, the display screen includes passive program listings grid 88. In FIG. 9b, the display screen includes interactive grid 601.

Figure 10:
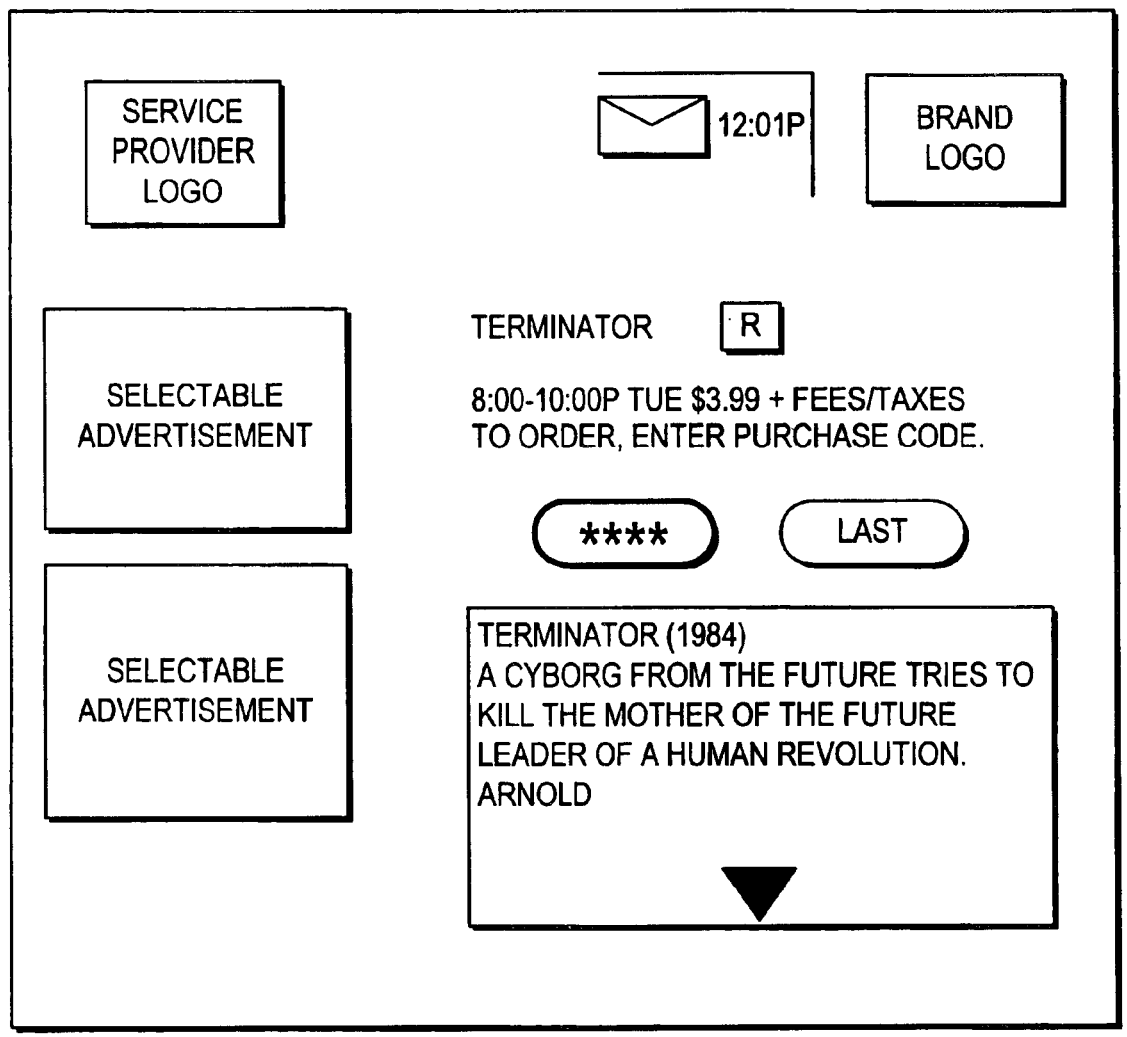
FIG. 10 is an illustrative order confirmation screen in accordance with the principles of the present invention.

The guide may also provide interactive components related to a video promotion that, for example, provide users with an opportunity to order programs or products associated with the video promotion. In response to a user selecting interactive advertisement banner 910, the guide may display an order confirmation screen, such as order confirmation screen 791 of FIG. 10. Order confirmation screen 791 may prompt a user for a purchase code. After a user enters a correct purchase code, the program guide may allow the user to watch the program and register the purchase with distribution facility 16. If the program is about to start or has already started, the program guide may tune to the channel on which the program is carried. If the ordered pay-per-view will not start for some time in the future, the program guide may set a reminder for the pay-per-view program.

Figure 11:
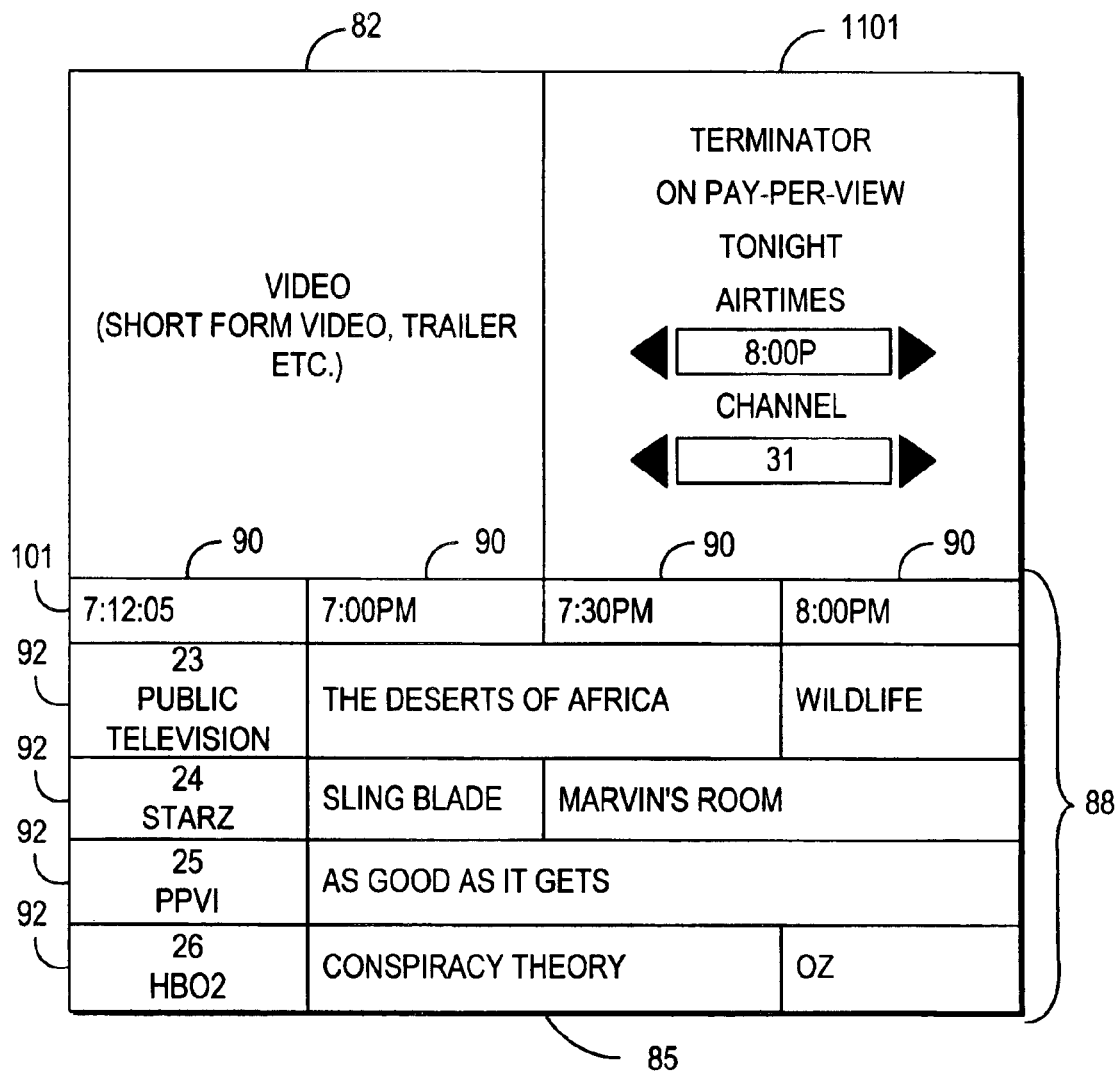
FIG. 11 is an illustrative hybrid guide display screen in which passive tagging information of FIG. 3a is overlaid with interactive tagging information in accordance with the principles of the present invention.

The interactive guide may also overlay a text display area over a passive guide text display area, such as text display area 84 of FIG. 3a, to provide users with text that is more appropriate to the interactive viewer. FIG. 11 illustrates this feature of the hybrid guide. In the example of FIG. 11, the passive guide is currently displaying a video promotion for the pay-per-view TERMINATOR. The hybrid guide may, for example, provide users with an opportunity to access additional air times or channels for pay-per-view programs. Such air times or channels may supplement the air times or channels displayed by a passive guide. In the example of FIG. 11, users may select text display area 1101 and arrow right or left to see additional air times or channels. Users may, for example, arrow up or down to switch between selecting air times and channels. In still another suitable approach, the interactive guide may determine that there are additional air times or channels and display the air times or channels in a passive text display area overlaying the text display area of the passive guide. If desired, passive program listings grid 88 may be overlaid with an interactive guide.

The interactive guide may also provide users with traditional guide features that operate based on the playlists or other passive guide characteristics. The guide may, for example, provide users with an opportunity to view program listings for passive guide videos. A user may access program listings for passive guide videos via an interactive guide main menu. Users may access the menu by, for example, pressing a "menu" key on remote control 40.

Figure 12:
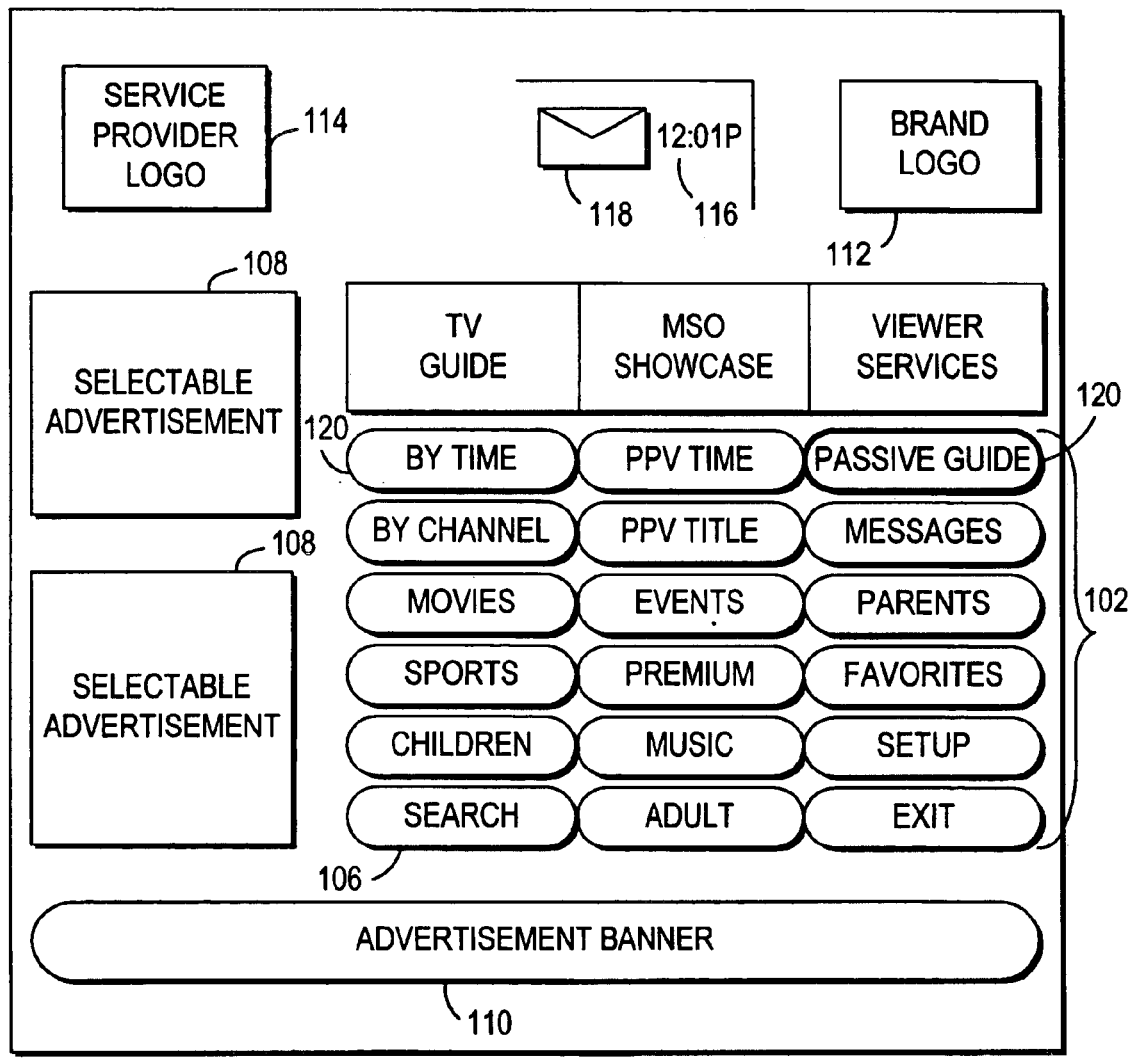
FIG. 12 is an illustrative interactive guide main menu screen having a selectable on-screen feature for providing users with access to passive guide program listings, in accordance with the principles of the present invention.

A main menu screen, such as illustrative main menu screen 100 of FIG. 12, may include menu 102 of selectable program guide features 106. If desired, program guide features 106 may be organized according to feature type. In menu 102, for example, program guide features 106 have been organized into three columns. The column labeled "TV GUIDE" is for listings related features, the column labeled "MSO SHOWCASE" is for multiple service organization (MSO) related features, and the column labeled "VIEWER SERVICES" is for viewer related features. The interactive television program guide may generate a display screen for a particular program guide feature when a user selects that feature from menu 102 with, for example, highlight region 120.

Main menu screen 100 may include one or more selectable advertisements 108. Selectable advertisements 108 may, for example, include text and graphics advertising pay-per-view programs or other programs, channels, or products. When a user selects a selectable advertisement 108 with, for example, highlight region 120, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The logos may be included in the program guide data allowing for on-the-fly configurability of the display screens. The current time may be displayed in clock display region 116. In addition, a suitable indicator such as indicator graphic 118 may be used to indicate to a user that mail from a cable operator or program guide provider is waiting for a user if the program guide supports messaging functions.

A user may indicate a desire to view program listings for passive guide videos by, for example, selecting selectable Passive Guide feature 106. In response, the interactive guide may generate a program listings screen that includes program listings information for the passive guide videos based on the playlists or other passive guide characteristics. An illustrative listings screen is shown in FIG. 13.

Figure 13:
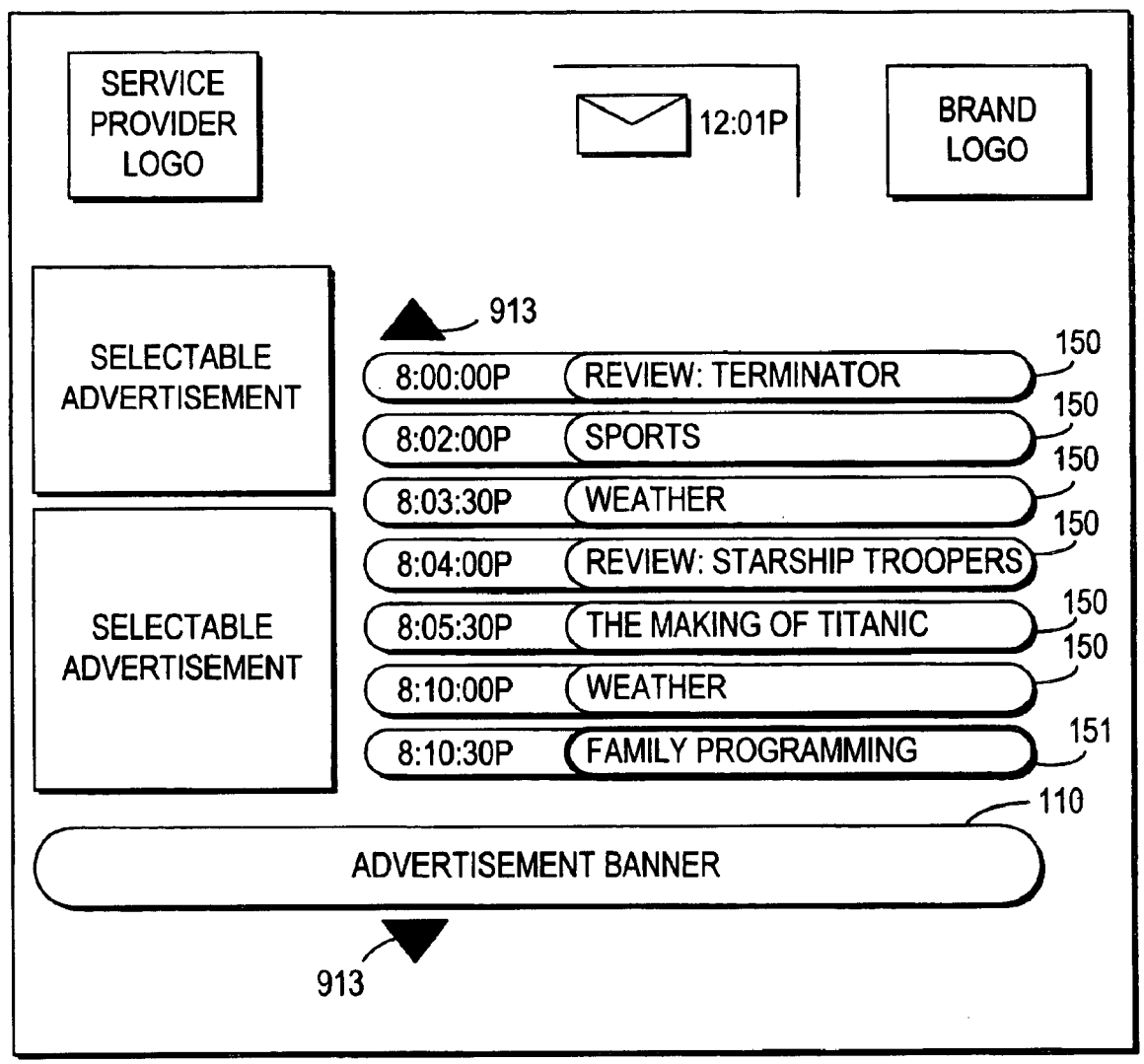
FIG. 13 is an illustrative interactive passive guide program listings screen in accordance with the principles of the present invention.

Program listings screen 130 of FIG. 13 may include highlight region 151, which highlights a program listing 150. A user may position highlight region 151 by entering appropriate commands with user input device 46. For example, if user input device 46 has a keypad, a user can position highlight region 151 using "up" and "down" arrow keys on remote control 40. In response to users pressing "up" and "down" arrows on remote control 40, the interactive guide may highlight a corresponding on-screen arrow 913 to indicate that an arrow key has been pressed.

A user may select a listing by, for example, pressing on the "OK" or "info" key on remote control 40. Alternatively, a touch sensitive screen, trackball, voice recognition device, or other suitable device may be used to move highlight region 151 or to select program listings without the use of highlight region 151. In still another approach, a user may speak a passive guide program listing into a voice request recognition system. These methods of selecting program listings are merely illustrative. Any other suitable approach for selecting program listings may be used if-desired.

A user may view additional listings by, for example, pressing an "up" or "down" arrow, or a "page up" or "page down" key on remote control 40. The user may also see listings for the next 24 hour period, or the last 24 hour period, by pressing a "day forward" or "day backward" key on remote control 40, respectively. If there are no listings starting exactly 24 hours in the indicated direction, the program guide may pick programs starting at either closer or further than 24 hours away. If desired, the program guide may require a user to scroll through advertisement banner 110.

Users may wish to obtain additional information about a passive guide video segment or its contents. Users may indicate a desire to obtain additional information by, for example, selecting a listing within listings screen 130. Alternatively, users may indicate a desire to access additional information for a video segment by, for example, pressing an "info" key on remote control 40 while viewing the segment with the hybrid guide.

Figure 14:
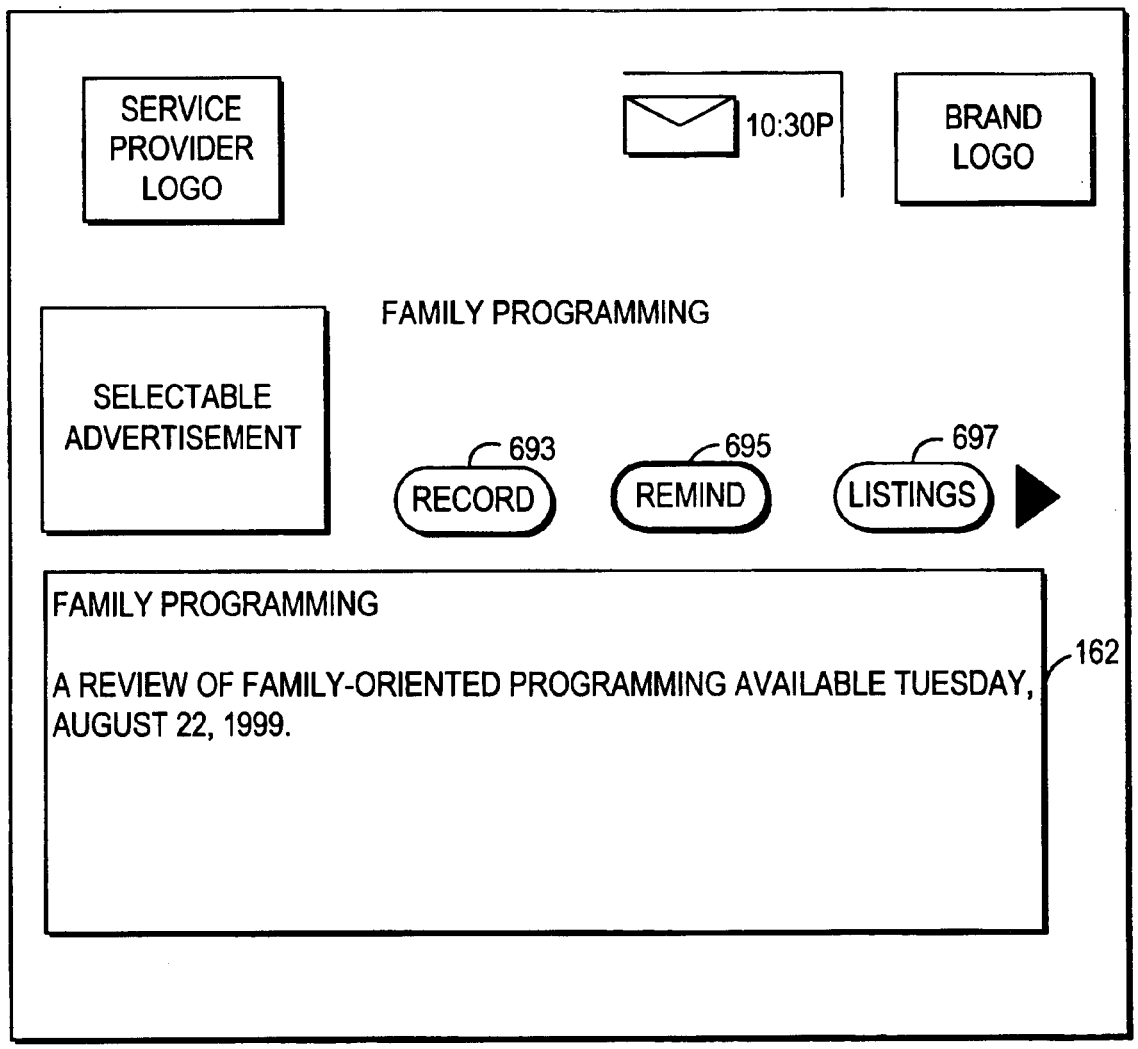
FIG. 14 is an illustrative additional information screen in accordance with the principles of the present invention.

When a user indicates a desire to view additional information for a passive guide video segment, the interactive guide may display an additional information screen for the video segment. FIG. 14 shows illustrative additional information screen 691 that the interactive guide may display when, for example, a user indicates a desire to access additional information for a "Family Programming" segment. Additional information screen 691 may provide users with an opportunity to access other interactive guide features for passive guide video segments. Interactive guide systems in which additional information screens provide users with access to interactive guide features are described, for example, in Rudnick et al. U.S. patent application Ser. No. 09/356,268, filed Jul. 16, 1999, which is hereby incorporated by reference herein in its entirety.

The interactive guide may provide users with an opportunity to access a list of program listings for programs promoted in the video segment. The passive guide characteristics provided to the interactive guide may include, for example, lists of programs associated with a given passive program guide video segment. When a user indicates a desire to access the list of associated programs by, for example, selecting onscreen LISTINGS feature 697, the interactive guide may obtain program listings information for the associated programs in the list. The interactive guide may display a program listings screen for the associated programs, such as program listings screen 130 of FIG. 13.

The interactive guide may also provide users with an opportunity to schedule reminders for video segments or for programs promoted within segments. Users may also schedule "on-going" reminders for series of segments or series of programs within segments. This may be accomplished in a similar manner as scheduling reminders for television program series as described, for example, in Knudson et al. U.S. patent application Ser. No. 09/330,792, filed Jun. 11, 1999, which is hereby incorporated by reference herein in its entirety.

Users may indicate a desire to schedule reminders for particular video segments by, for example, selecting a video segment from listings screen 130 and pressing a suitable key, such as a "remind" key, on remote control 40. Alternatively, users may indicate a desire to schedule reminders for segments by selecting on-screen REMIND feature 695 in additional information screen 691. When a user indicates a desire to schedule a reminder for a video segment, the interactive guide may schedule a reminder for the segment based, for example, on a segment identifier in the passive guide characteristics. Any suitable approach for scheduling reminders with an interactive guide may be used. In addition, users may also schedule reminders for programs promoted in a segment by, for example, accessing listings associated with a segment and scheduling a reminder using any suitable approach. If desired, users may be prompted to schedule an on-going or "series" reminder for the video segment.

Figure 15:
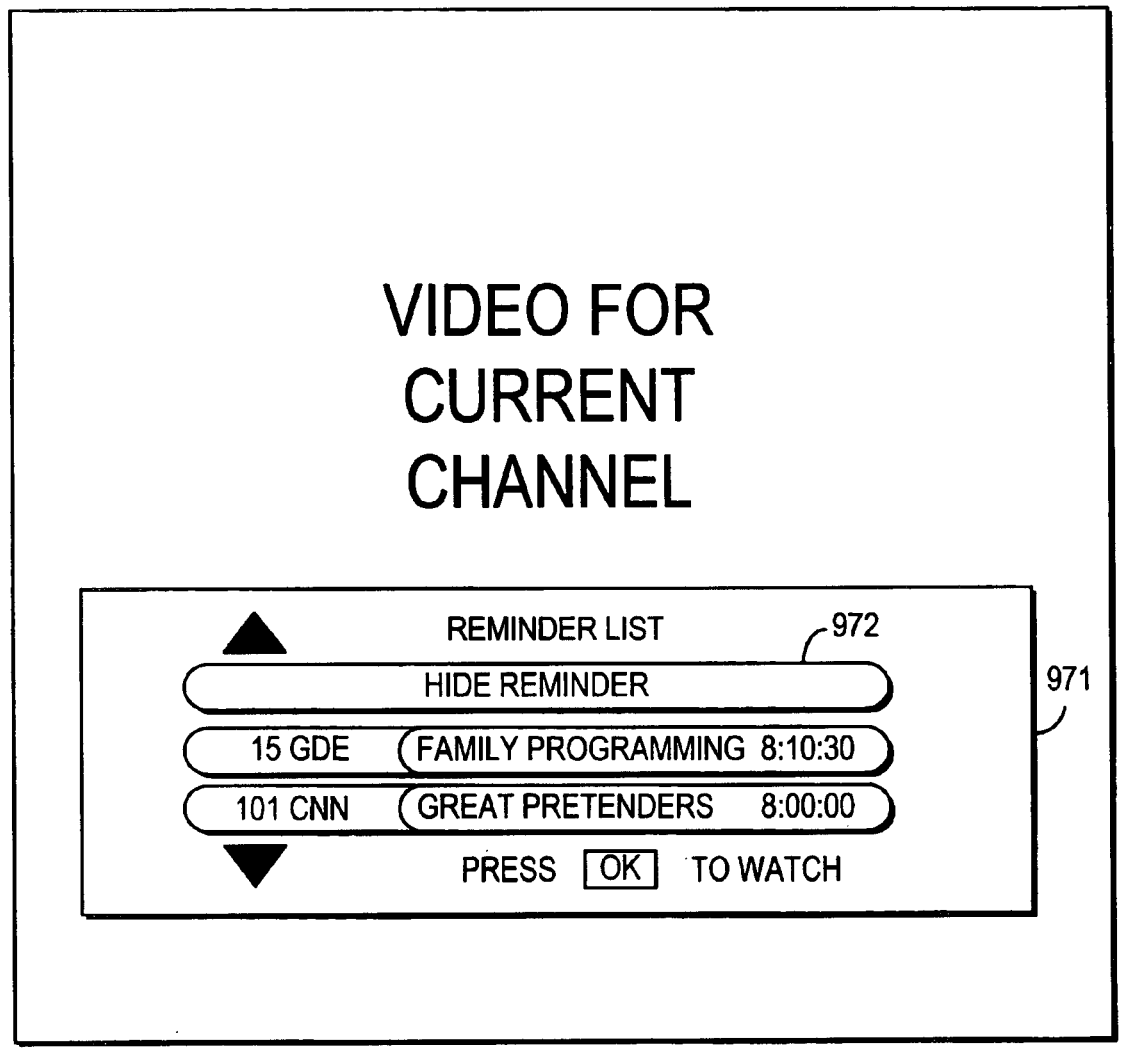
FIG. 15 shows an illustrative reminder list overlay in accordance with the principles of the present invention.

The interactive program guide may remind a user that a passive guide video segment or associated program (or segment or program in a series for an ongoing reminder) is airing at the time the segment or associated program airs. In an alternative approach, the interactive program guide may remind a user at some predetermined period of time before the video segment or associated program airs. FIG. 15 shows illustrative reminder list 971. Reminder list 971 may be overlaid on top of the currently displayed television program to provide a user with an opportunity to view a reminder while still viewing a portion of the television program that a user is watching. The interactive program guide may provide a user with an opportunity to scroll through reminder list 971 by, for example, using remote control arrow keys. The interactive program guide may hide reminder list 971 when, for example, a user selects hide reminder feature 972. The guide may also display reminder list 971 if, for example, the user presses an "OK" key at any time while watching TV. Reminder list 971 of FIG. 15 lists reminders for a family programming video segment and its associated programs because, for example, reminders have been scheduled for both.

The hybrid guide may provide users with an opportunity to record video segments or associated programs with one or more of digital storage device 49 (FIG. 5), secondary storage device 47 (FIG. 5), or program guide server 25 (FIGS. 2b and 2d). Systems in which programs are remotely recorded on servers are described, for example, in above-mentioned Ellis et al. U.S. patent application Ser. No. 09/332,244, filed Jun. 11, 1999. Users may also record series of video segments or promoted programs. This may be accomplished in a similar manner as television program series are recorded as described, for example, in above-mentioned Knudson et al. U.S. patent application Ser. No. 09/330,792, filed Jun. 11, 1999.

Users may indicate a desire to record a passive guide segment by, for example, pressing a "record" key on remote control 40 while watching the video segment with the hybrid guide. In response, the interactive guide may direct digital storage device 49, secondary storage device 47, or program guide server 25 to record the passive guide channel using any suitable approach. Alternatively, users may indicate a desire to record passive guide video segments by, for example, selecting a segment listing from within program listings screen 130 of FIG. 13 and pressing a "record" key on remote control 40. If the segment is not currently being aired, the interactive guide may schedule the segment for recording using any suitable approach. Users may also indicate a desire to record passive guide video segments or associated programs by selecting on-screen RECORD feature 693 (FIG. 14) from within additional information screens for the segments or programs, respectively. In still another suitable approach, associated programs may be recorded by, for example, selecting an associate program listing and pressing a "record" key on remote control 40.

If desired, control circuitry 42 may have sufficient tuning circuitry to provide for tuning to multiple channel simultaneously. This approach may allow users to watch one channel, while simultaneously recording the passive guide or a program associated with a passive guide video segment from another channel. Systems in which interactive television program guides provide for the simultaneous watch and record of programs from multiple channels are described, for example, in Lemmons et al. U.S. patent application Ser. No. 09/329,850, filed Jun. 11, 1999, which is hereby incorporated by reference herein in its entirety.

Either the entire passive guide channel display or just the video display area may be recorded. When the entire passive guide channel display is recorded, the interactive guide may also record the passive guide characteristics associated with the passive guide channel for the recorded time period. Corresponding program guide data for display in the hybrid guide may also be recorded. When the passive guide channel is played back, the interactive guide may provide users with an opportunity to access interactive features and information related to the recorded passive guide segment, just as if the passive guide segment were originally aired and as if the hybrid guide would have been provided. Systems in which programs and program guide data are recorded on digital recording devices and in which users are provided with an opportunity to access the data as if the programs were originally aired are described, for example, in above-mentioned Hassell et al. U.S. patent application Ser. No. 09/157,256, filed Sep. 17, 1998.

When just the video portion of the passive guide channel is recorded, the interactive guide may determine where the video portion of the passive guide is displayed based on, for example, the passive guide characteristics. More specifically, the passive guide characteristics may include an identifier of the desired segment and the coordinates of the segment as it is displayed on the passive guide display screen. Control circuitry 42 may be programmed with suitable video capture software. The interactive guide may direct control circuitry 42 to capture the video display area of the passive guide display screen and record it as a digital stream. The interactive guide may also, if desired, record the passive guide characteristics and program guide data for the time period during which the desired segment is aired.

When just the video display of the passive guide is recorded, the interactive guide may play back the recorded video alone, or may generate a hybrid guide display as though the hybrid guide were being presented at the original time the video was aired. If the video alone is played back, control circuitry 42 may be programmed to expand and center the recorded video so that the video is played back in a format more suitable for being played back alone (i.e., without the other display areas of the passive guide channel).

Figure 16:
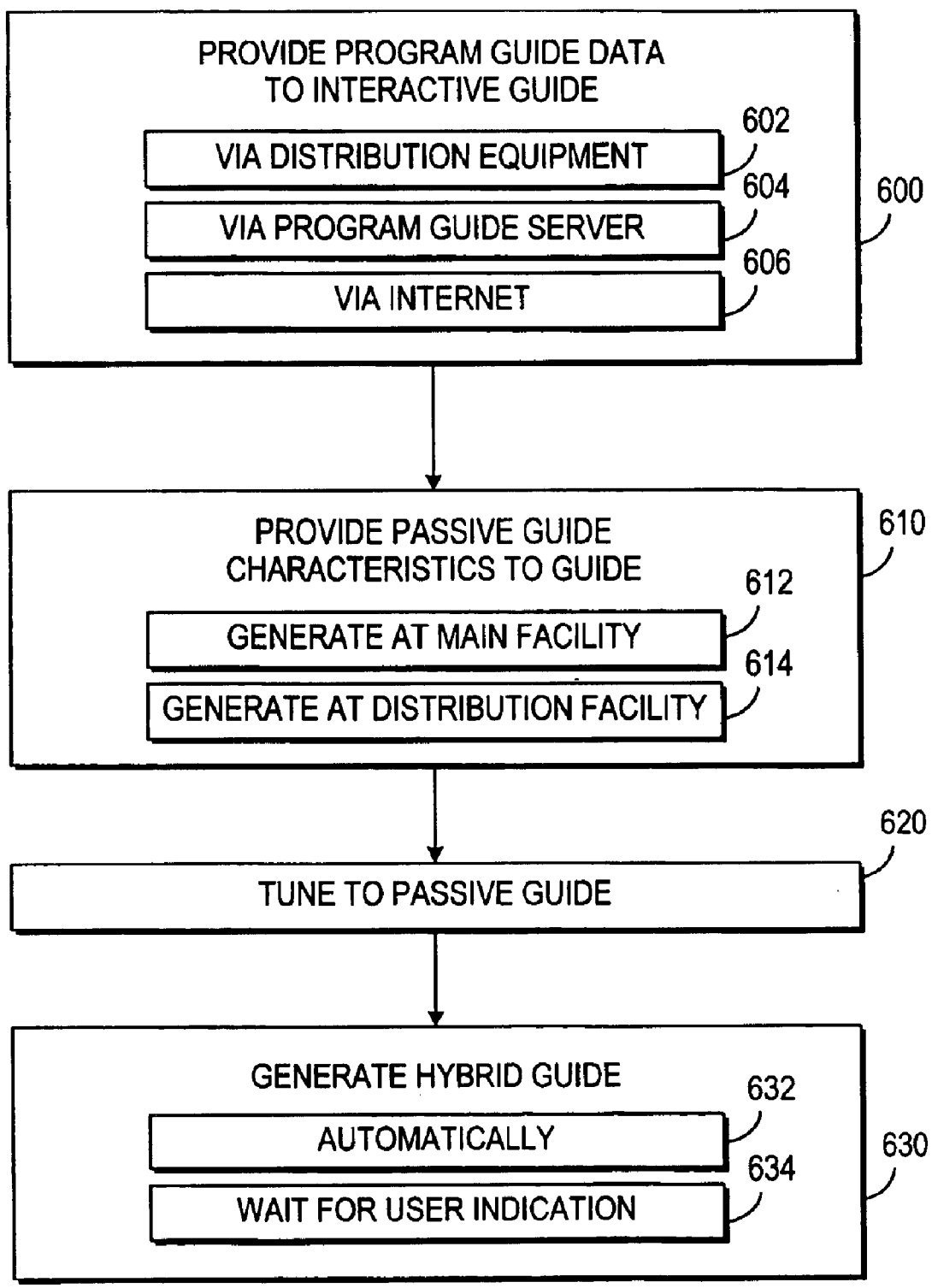
FIGS. 16 and 17 are flowcharts of illustrative steps involved in providing a hybrid passive-interactive program guide in accordance with the principles of the present invention.

FIG. 16 shows a flowchart of illustrative steps involved in providing a hybrid passive-interactive program guide in accordance with the principles of the present invention. The steps shown in FIG. 16 may be performed in any suitable order, and various steps and substeps may be omitted if desired.

At step 600, program guide data is provided to the interactive guide implemented on television program guide equipment 17. This step may include one or more substeps. Providing program guide data may include, for example, providing program guide data from main facility 12 or other sources to distribution equipment 21 for distribution to an interactive program guide implemented on user television equipment 22, such as in the approach shown in FIG. 2a (step 602). Alternatively, program guide data may be provided to program guide server 25 for distribution to a program guide client as data or included in digital frames, such as in the approach shown in FIG. 2b (step 604). In still another suitable approach, program guide data may be provided to distribution equipment 21 or program guide server 25 via the Internet and Internet service system 61, such as shown in FIGS. 2c and 2d (step 606).

At step 610, passive guide characteristics are provided to the interactive program guide implemented on television program guide equipment 17. Passive guide characteristics may include any suitable information indicating the content of the passive guide product, such as the screen components of the passive guide display screen (e.g., videos, program listings grid, etc.), the size and location of the components, the listings that are being displayed, the period with which listings are paged or the speed with which listings are scrolled, which program segment is currently active in the video portion, the content of the videos (e.g., programs or products that are promoted by a video), the channel and call letters of the passive guide, a source identifier or other identifier of the passive guide, or any other suitable information. The passive guide characteristics may also include national or local playlists according to which passive guide videos are displayed.

Providing passive guide characteristics to the interactive guide may include one or more substeps. Providing passive guide characteristics may include, for example, generating the passive guide characteristics at main facility 12 and providing the characteristics to television program guide equipment 17 with the program guide data (step 612). Alternatively, suitable hardware in distribution facility 16, such as screen generator 29, may generate the passive guide characteristics. The characteristics may be generated, for example, while screen generator 28 generates passive guide display screens for distribution. Alternatively, the passive guide characteristics may be generated based on a national or local playlist before the actual display screens are generated. The characteristics may be distributed with or apart from the program guide data using any suitable distribution approach depending on the architecture of the program guide system.

At step 620, suitable hardware in user television equipment 22, such as suitable tuning circuitry in control circuitry 42 (FIG. 5), tunes to the passive guide channel. Such circuitry may tune to the passive guide channel directly in response to the user tuning to the channel with remote control 40 (FIG. 4), or may tune under the direction of the interactive television program guide.

The interactive guide may direct control circuitry 42 to tune to the passive guide channel in response to the user indicating a desire to access the passive guide. The user may indicate such a desire by entering a suitable command with user input device 46. The user may, for example, tune to the passive guide by entering the channel number of the passive guide directly, or by flipping channels until control circuitry 42 tunes to the passive guide channel. In still another approach, the user may access the passive guide directly by pressing a suitable key on user input device 46, or by selecting an on-screen option when in the interactive television program guide.

A hybrid guide is generated at step 630. The hybrid guide may be generated by the interactive guide using any suitable overlay technique to overlay program listings display areas, text display areas, graphic display areas, video display areas, or interactive feature areas onto the passive guide display screen. Interactive feature areas may include any suitable interactive feature presented by the program guide to replace or supplement a passive feature of the passive guide. The interactive guide may generate the passive guide immediately when a user tunes to the passive guide channel. Alternatively, the interactive guide may wait to generate the hybrid guide until the user indicates a desire to access interactive features with user input device 46. For example, the guide may overlay passive listings with interactive listings in response to a user indicating a desire to select a program listing by pressing an arrow key on remote control 40.

Figure 17:
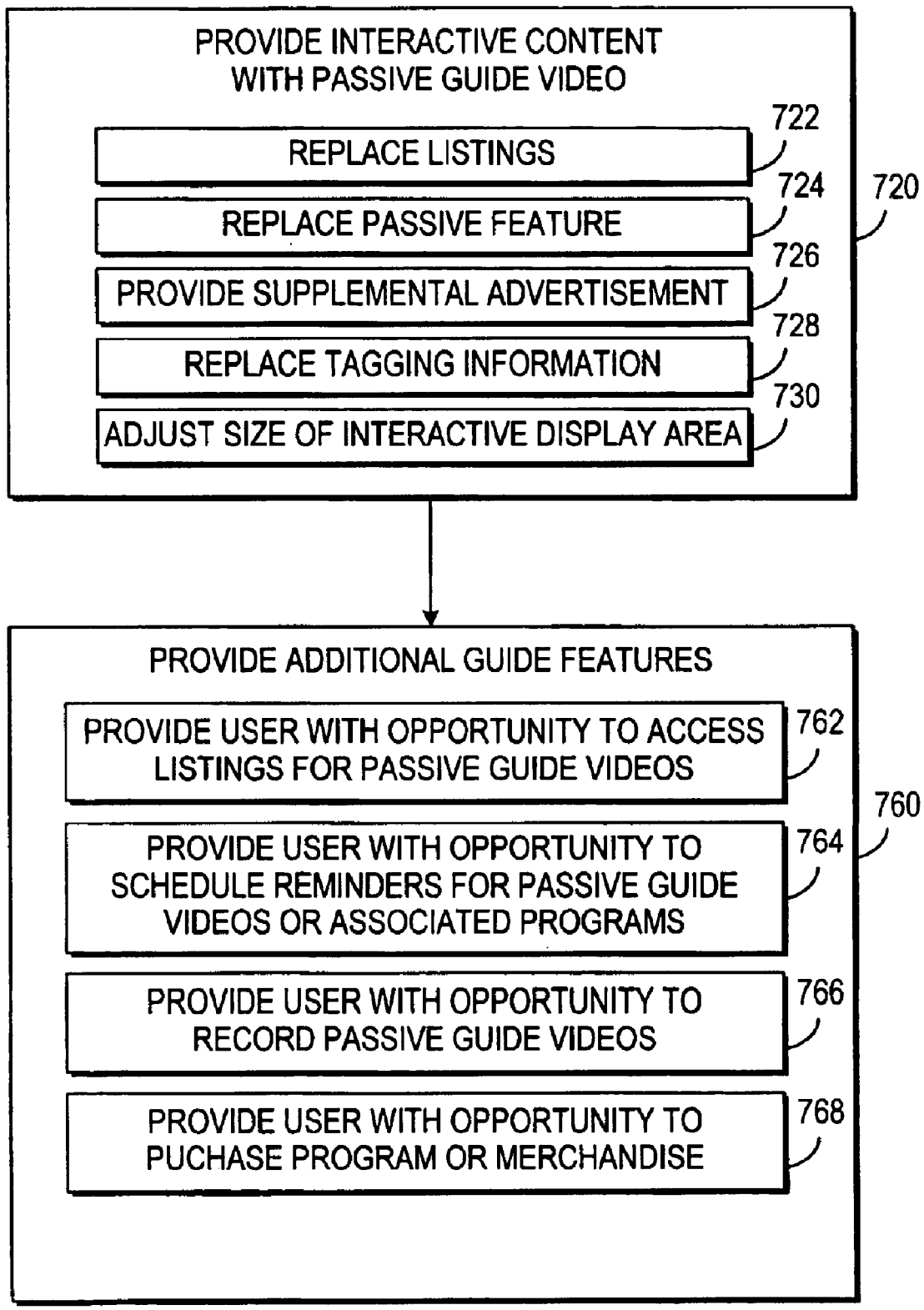

FIG. 17 is a flowchart of illustrative steps involved in generating a hybrid guide in accordance with the principles of the present invention. The steps shown in FIG. 17 may be performed in any suitable order, and various steps and substeps may be omitted if desired.

At step 720, the interactive program guide provides interactive content to the user with the video of the passive guide. The interactive guide may provide any suitable interactive content. The interactive guide may, for example, replace the program listings area of a passive guide (e.g., program listings areas 85 of FIGS. 3a and 3b) with an interactive listings area (step 722). The interactive guide may determine the current time slot and channel for which listings are displayed by the passive guide based, for example, on the passive guide characteristics, and may display interactive listings for the same time slot and channel.

The interactive guide may replace passive features of the passive guide with interactive ones (step 724). The interactive guide may, for example, overlay a display area of the passive guide with an interactive feature area to generate a hybrid guide with the interactive feature. The interactive guide may-provide supplemental advertisements based on the playlist or other passive guide characteristics (step 726). The supplemental advertisements may be passive or interactive. The interactive guide may replace tagging information of the passive guide with more suitable tagging information at step 728, and may adjust the sizes of any interactive display areas based on the change in sizes of other passive guide display areas, at step 730.

The hybrid guide may also include feature of the interactive guide that operate based on features of the passive guide. At step 760, additional guide features are provided. The additional guide features may include, for example, providing users with an opportunity to access program listings for passive guide videos (step 762), providing users with an opportunity to schedule reminders for passive guide videos or associated programs (764), providing users with an opportunity to record passive guide videos (step 766), or providing users with an opportunity to purchase programs or related merchandise (step 768).

The foregoing is merely illustrative of the principles of this invention and various modifications can be made by those skilled in the art without departing from the scope and spirit of the invention.

What is claimed is:

1. A hybrid passive-interactive television program guide system comprising:
   a main facility comprising:
   a data source configured to provide program guide data having program listings information; and
   a transmitter configured to transmit the program guide data to television program guide equipment on which an interactive television program guide is implemented, wherein:
   the television program guide equipment comprises:
   a receiver configured to receive the program guide data;
   a screen generator configured to generate a passive guide display screen in which the program listings information is displayed, wherein the program listings start with a given program listing;
   user television equipment on which the interactive television program guide is at least partially implemented;
   distribution equipment configured to distribute program guide data, passive guide characteristics, and the passive guide display screen to the user television equipment, wherein the passive guide display screen is distributed over a given television channel; and
   the interactive television program guide is programmed to overlay the program listings information of the passive program guide display screen with interactive television program listings, wherein the interactive television program listings start at the given program listing based on the passive guide characteristics.

2. The system defined in claim 1 wherein the interactive television program guide is further programmed to determine the type of the given program listings and to display interactive program listings of the same type.

3. The system defined in claim 1 wherein the interactive television program guide is programmed to overlay the program listings information of the passive program guide display screen with interactive television program listings after a user indicates a desire to interact with the program listings information of the passive program guide display screen.

4. The system defined in claim 1 wherein the screen generator is further programmed to generate the passive guide characteristics.

5. The system defined in claim 1 wherein the passive guide characteristics includes a playlist.

6. The system defined in claim 1 wherein:
   videos are displayed in a video display area;
   the program listings information is displayed in a passive program listings area;
   the interactive program listings are displayed in an interactive program listings area overlaid onto the passive program listings area; and
   the interactive television program guide is further programmed to resize the interactive program listings area based on the passive guide display characteristics when the video display area changes in size.

7. A hybrid passive-interactive television program guide system comprising:
   a main facility comprising:
   a data source configured to provide program guide data having program listings information;
   an information source configured to provide information for a passive guide feature selected from the group of information comprising video and data;
   a transmitter configured to transmit the program guide data to television program guide equipment on which an interactive television program guide is implemented, wherein:
   the television program guide equipment comprises:
   a receiver configured to receive the program guide data;
   a screen generator configured to generate a passive guide display screen in which the information for a passive guide feature and the program listings information are displayed;
   user television equipment on which the interactive television program guide is at least partially implemented;
   distribution equipment configured to distribute program guide data, passive guide characteristics, and the passive guide display screen to the user television equipment, wherein the passive guide display screen is distributed over a given television channel; and
   the interactive television program guide is programmed to overlay an interactive feature onto the passive guide display screen, wherein the interactive feature corresponds to the passive guide feature and is based on the passive guide characteristics.

8. The system defined in claim 7 wherein the interactive television program guide is programmed to overlay an interactive Internet-based feature onto the passive guide display screen, wherein the interactive Internet-based feature corresponds to the passive guide feature and is based on the passive guide characteristics.

9. The system defined in claim 7 wherein the screen generator is further programmed to generate the passive guide characteristics.

10. The system defined in claim 7 wherein the passive guide characteristics includes a playlist.

11. A hybrid passive-interactive television program guide system comprising:
    a main facility comprising:
    a data source configured to provide program guide data having program listings information;
    an information source configured to provide passive guide content;
    a transmitter configured to transmit the program guide data to television program guide equipment on which an interactive television program guide is implemented, wherein:

the television program guide equipment comprises:
a receiver configured to receive the program guide data;
a screen generator configured to generate a passive guide display screen in which the passive guide content is displayed;
user television equipment on which the interactive television program guide is at least partially implemented;
distribution equipment configured to distribute program guide data, passive guide characteristics, and the passive guide display screen to the user television equipment, wherein the passive guide display screen is distributed over a given television channel; and
the interactive television program guide is programmed to overlay a supplemental advertisement onto the passive guide display screen, wherein the supplemental advertisement corresponds to passive guide content displayed in the passive guide display screen and is based on the passive guide characteristics.

12. The system defined in claim 11 wherein the supplemental advertisement is an interactive advertisement.

13. The system defined in claim 11 wherein the interactive television program guide is further programmed to provide a user with an opportunity to order a program associated with passive guide content displayed in the passive guide display screen, based on the passive guide characteristics.

14. The system defined in claim 11 wherein the interactive television program guide is further programmed to provide a user with an opportunity to order merchandise associated with passive guide content displayed in the passive guide display screen, based on the passive guide characteristics.

15. The system defined in claim 11 wherein the screen generator is further programmed to generate the passive guide characteristics.

16. The system define in claim 11 wherein the passive guide characteristics includes a playlist.

17. A hybrid passive-interactive television program guide system comprising:
a main facility comprising:
a data source configured to provide program guide data having program listings information;
a video source configured to provide videos;
a transmitter configured to transmit the program guide data having program listings information to television program guide equipment on which an interactive television program guide is implemented, wherein:
the television program guide equipment comprises:
a receiver configured to receive the program guide data;
a screen generator configured to generate a passive guide display screen having a video display area in which the videos are displayed, and a first text display area in which text is displayed, wherein the text corresponds to the video displayed in the video display area;
user television equipment on which the interactive television program guide is at least partially implemented;
distribution equipment configured to distribute program guide data, passive guide characteristics, and the passive guide display screen to the user television equipments wherein the passive guide display screen is distributed over a given television channel; and
the interactive television program guide is programmed to overlay a second text display area onto the first text display area of the passive guide display screen, wherein text displayed in the second text display area is based on the passive guide characteristics and corresponds to the video displayed in the video display area.

18. The system defined in claim 17 wherein the second text display area is an interactive text display area.

19. The system defined in claim 17 wherein the screen generator is further programmed to generate the passive guide characteristics.

20. The system defined in claim 17 wherein the passive guide characteristics includes a playlist.

21. A hybrid passive-interactive television program guide system comprising:
a main facility comprising:
a data source configured to provide program guide data having program listings information;
a video source configured to provide videos;
a transmitter configured to transmit the program guide data to television program guide equipment on which an interactive television program guide is implemented, wherein:
the television program guide equipment comprises:
a receiver configured to receive the program guide data;
a screen generator configured to generate a passive guide display screen in which the videos are displayed;
user television equipment on which the interactive television program guide is at least partially implemented;
distribution equipment configured to distribute program guide data, passive guide characteristics, and the passive guide display screen to the user television equipment, wherein the passive guide display screen is distributed over a given television channel; and
the interactive television program guide is programmed to provide a user with an opportunity to access interactive program listings information for the videos based on the passive guide characteristics.

22. The system defined in claim 21 wherein the interactive television program guide is further programmed to provide a user with an opportunity to access additional information for the videos based on the passive guide characteristics.

23. The system defined in claim 21 wherein the interactive television program guide is further programmed to provide a user with an opportunity to schedule a reminder for a video associated with a program listing.

24. The system defined in claim 21 wherein the interactive television program guide is further programmed to provide a user with an opportunity to record a video associated with a program listing with the television program guide equipment.

25. The system defined in claim 24 wherein the user television equipment comprises a storage device on which the video associated with the program listing is recorded.

26. The system defined in claim 21 wherein the screen generator is further programmed to generate the passive guide characteristics.

27. The system defined in claim 21 wherein the passive guide characteristics includes a playlist.

28. A method for providing a hybrid passive-interactive television program guide, comprising:
providing a passive television program guide with which program listings are displayed on user television equipment over a given television channel; and
providing an interactive television program guide that is implemented on the user television equipment, wherein the interactive television program guide overlays at least a portion of the program listings displayed by the passive television program guide with synchronized program listings.

29. A method for providing a hybrid passive-interactive television program guide, comprising:

providing a passive television program guide with which content on various subjects is displayed in a display area on user television equipment over a given television channel; and providing an interactive television program guide that is implemented on the user television equipment, wherein the interactive television program guide overlays at least a portion of the display area with an interactive feature area, wherein the interactive feature area contains a feature that corresponds to the subject of the content that is being displayed in the display area when the portion of the display area is replaced with the interactive feature area.

30. A method for providing a hybrid passive-interactive television program guide, comprising:

providing a passive television program guide on user television equipment over a given television channel; and simultaneously displaying an interactive advertisement region and at least a portion of the passive television program guide with the user television equipment.

31. The method defined in claim 30 further comprising providing video with the passive television program guide.

32. A method for supplementing a television program guide, comprising:

providing a passive television program guide with which promotional video content for television programs and corresponding textual information on those television programs are displayed on user television equipment over a given channel; and supplementing the textual information with interactive text using the user television equipment.

33. A method for providing listings for scheduled passive program guide content, comprising:

providing a passive television program guide with which videos on various subjects are scheduled to be displayed on user television equipment over a given television channel; and displaying an interactive listings screen with the user television equipment, wherein the interactive listings screen contains listings for the scheduled passive program guide videos.

34. A hybrid passive-interactive television program guide system comprising:

means for providing a passive television program guide having program listings information over a given television channel;

means for overlaying the program listings information of the passive television program guide with synchronized interactive television program listings information.

35. The system defined in claim 34 wherein the means for overlaying the program listings information comprises means for replacing overlaying the program listings information with synchronized interactive television program listings information when a user indicates a desire to interact with the program listings information.

36. The system defined in claim 34 wherein:

the passive television program guide further includes at least one video display area that changes size;

the system further comprises means for displaying the synchronized interactive television program listings information in a listings display area having a size; and the means for displaying the synchronized interactive television program listings information comprises means for resizing the listings display area when the video display area changes size.

37. A hybrid passive-interactive television program guide system comprising:

means for providing a passive television program guide having at least one passive guide feature over a given television channel; and means for replacing overlaying the passive guide feature with an interactive feature.

38. The system defined in claim 37 wherein the means for overlaying the passive guide feature with an interactive feature, comprises means for overlaying the passive guide feature with an Internet based interactive feature.

39. A hybrid passive-interactive television program guide system comprising:

means for providing a passive television program guide having at least one video over a given television channel; and means for displaying an advertisement that corresponds to the video with the video.

40. The system defined in claim 39 wherein the means for displaying an advertisement that corresponds to the video with the video comprises means for displaying an interactive advertisement that corresponds to the video with the video.

41. The system defined in claim 39 further comprising means for providing a user with an opportunity to order a program associated with the video.

42. A hybrid passive-interactive television program guide system comprising:

means for providing a passive guide having video and passive text associated with the video over a given television channel; and means for overlaying the passive text with text associated with the video.

43. The system defined in claim 42 wherein the means for overlaying the passive text comprises means for overlaying the passive text with interactive text associated with the video.

44. A hybrid passive-interactive television program guide system comprising:

means for providing a passive program guide that displays a plurality of videos over a given television channel; and means for displaying program listings for the videos.

45. The system defined in claim 44 further comprising means for providing a user with an opportunity to access additional information for the videos.

46. The system defined in claim 44 further comprising means for providing a user with an opportunity to schedule a reminder for at least one of the videos.

47. The system defined in claim 44 further comprising means for providing a user with an opportunity to record at least one of the videos.

* * * * *